US007169048B2

(12) United States Patent
Nozaki et al.

(10) Patent No.: US 7,169,048 B2
(45) Date of Patent: Jan. 30, 2007

(54) GAMING MACHINE CAPABLE OF CONDUCTING DEMONSTRATION DISPLAY

(75) Inventors: Takashi Nozaki, Tokyo (JP); Tomokazu Nakata, Tokyo (JP)

(73) Assignee: Aruze Corporation, Tokyo (JP)

( * ) Notice: Subject to any disclaimer, the term of this patent is extended or adjusted under 35 U.S.C. 154(b) by 256 days.

(21) Appl. No.: 10/697,005

(22) Filed: Oct. 31, 2003
(Under 37 CFR 1.47)

(65) Prior Publication Data

US 2004/0254015 A1 Dec. 16, 2004

(30) Foreign Application Priority Data

Nov. 19, 2002 (JP) ............................ 2002-335610

(51) Int. Cl.
*A63F 13/00* (2006.01)

(52) U.S. Cl. ........................................................ 463/30

(58) Field of Classification Search .................. 463/20, 463/30–31
See application file for complete search history.

(56) References Cited

U.S. PATENT DOCUMENTS

| | | | | |
|---|---|---|---|---|
| 6,004,208 | A | 12/1999 | Takemoto et al. | |
| 6,106,393 | A | 8/2000 | Sunaga et al. | |
| 6,206,781 | B1 | 3/2001 | Sunaga et al. | |
| 6,375,570 | B1 | 4/2002 | Poole | |
| 6,517,433 | B2 * | 2/2003 | Loose et al. | 463/20 |
| 2001/0031658 | A1 | 10/2001 | Ozaki et al. | |
| 2003/0087690 | A1 | 5/2003 | Loose et al. | |

FOREIGN PATENT DOCUMENTS

| | | | |
|---|---|---|---|
| EP | 1054368 | A2 | 11/2000 |
| EP | 1054368 | A2 * | 11/2000 |
| GB | 2086115 | A | 5/1982 |
| JP | 2001-353255 | A | 12/2001 |
| WO | WO-00/32286 | | 6/2000 |
| WO | WO-03-039699 | A1 | 5/2003 |

OTHER PUBLICATIONS

European Search Report Dated Aug. 6, 2004.

* cited by examiner

*Primary Examiner*—Kim Nguyen
(74) *Attorney, Agent, or Firm*—Rader, Fishman & Grauer PLLC

(57) ABSTRACT

The gaming machine comprises: game result display means for displaying a game result thereon; the main control circuit 41 for generating a beneficial state for a player when a specific game result is displayed on the game result display means; and the sub-control circuit 71 for controlling the game result display means so as to conduct demonstration display for collecting players based on information concerning with a game.

9 Claims, 12 Drawing Sheets

FIG.7A WHEN LIQUID CRYSTAL EXISTING AT SYMBOL DISPLAY AREAS IS NOT DRIVEN
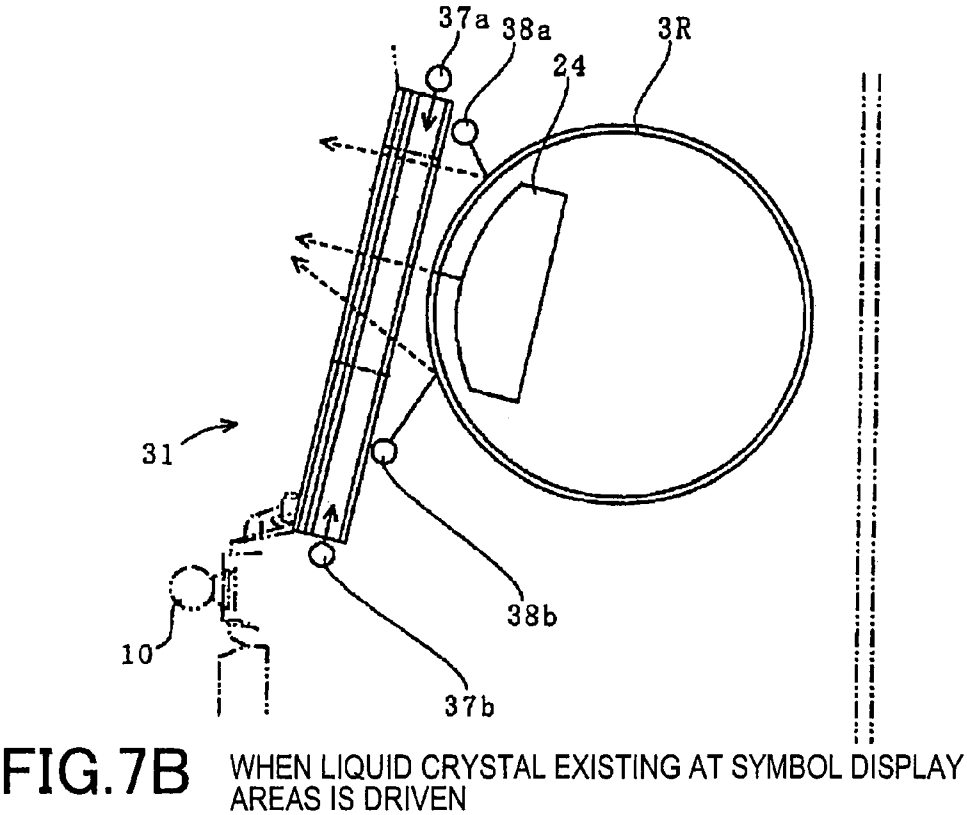
FIG.7B WHEN LIQUID CRYSTAL EXISTING AT SYMBOL DISPLAY AREAS IS DRIVEN
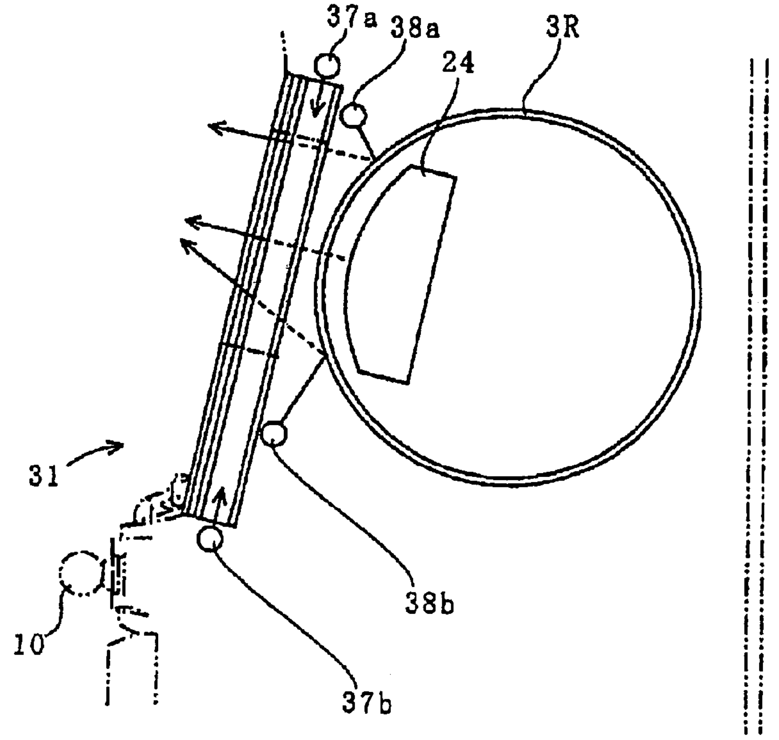

(TREATMENT CONCERNING WITH "DEMO" DISPLAY)

GAMING MACHINE CAPABLE OF CONDUCTING DEMONSTRATION DISPLAY

FIELD OF TECHNOLOGY

The present invention relates to a gaming machine having variable display means for variably displaying various symbols necessary for a game and control means such as microcomputer and the like for controlling the variable display, the gaming machine including so-called Japanese pachi-slot machine; slot machine; ball flipping machine such as the first grade~third grade Japanese pachinko machine, arrange ball machine, mah-jong ball gaming machine or slit-slot machine; video slot machine; video poker machine and the like.

DESCRIPTION OF RELATED ART

For example, the Japanese pachi-slot machine has a mechanically variable display device in which it is provided a plurality of rotating reels each of which variably displays plural symbols within a display window arranged in front of the machine, the reels being parallel provided in plural lines. According to start operation by a player, the control means drives and controls the variable display device and the reels are rotated, thereby symbols on the reels are variably displayed. And rotation of each reel is stopped automatically or based on stop operation by the player. At that time, in a case that the symbols of each reel appearing within the display window comprises a predetermined combination (the winning mode), game media such as medals or coins are paid out, thereby a predetermined benefit is given to the player.

Further, it has been previously proposed a gaming machine having a plurality of reel drums, reel strips each of which is arranged on an outer periphery of each reel drum and on each outer surface of which the symbols are described in a divided manner, light sources each of which illuminates the symbol division on each reel strip from the backside thereof and is arranged within each reel drum and control means for controlling illumination by the light sources. Here, in the reel strip, the symbol portion is made semitransparent and the background of the symbol is made transparent or semitransparent, and the light source is constructed from a plurality of luminous diodes arranged in a dot-matrix manner. The control means controls light emission of each luminous diode, thereby light emission of the light source is controlled so as to display characters or figures by the emitted diodes.

And, in the above gaming machine, it is known a gaming machine that demonstration display for collecting players is done when gaming operation for starting a game is not conducted even after a predetermined time is elapsed.

See, for example, Japanese unexamined Publication No. 2001-353255.

SUMMARY OF THE INVENTION

However, the above mentioned demonstration display is very simple, thus there is a case that interest for games is lacked.

The object of the present invention is to provide a gaming machine in which demonstration display for collecting players is conducted based on information concerning with a game, thereby interest for games can be raised.

The gaming machine of the present invention comprises: game result display means (for example, the reels 3L, 3C, 3R and the liquid crystal display device 31 mentioned later) for displaying a game result thereon; beneficial state generating means (for example, the main control circuit 41) for generating a beneficial state for a player when a specific game result is displayed on the game result display means; and demonstration display control means (for example, the demonstration display control means 106) for controlling the game result display means so as to conduct demonstration display (for example, the demonstration display mentioned later) for collecting players based on information concerning with a game.

The gaming machine of the present invention further comprises:

internal winning combination determination means (for example, the CPU 43 mentioned later) for determining an internal winning combination; and game result display control means (for example, the main control circuit 41 and the sub-control circuit 71 mentioned later) for controlling the game result display means based on a determined result by the internal winning combination determination means; wherein the demonstration display control means may control the game result display means based on information concerning with the internal winning combination included in the information concerning with the game.

In the gaming machine of the present invention, the demonstration display control means may not control the game result display means when the information concerning with the internal winning combination indicates that a specific winning combination is the internal winning combination.

In the gaming machine of the present invention, the demonstration display control means may be constructed so as to be able to control the game result display means to display by a plurality of display modes including a specific demonstration display mode, and the game result display means may be controlled to display by the specific demonstration display mode when the information concerning with the internal winning combination indicates that the specific winning combination is the internal winning combination.

In the gaming machine of the present invention, the game result display means may include first display means (for example, the reels 3L, 3C, 3R mentioned later) including a plurality of symbol display parts (for example, the reel sheet mentioned later) in which variable display and stop display of one or more of the symbols can be done and second display means (for example, the liquid crystal display device 31 mentioned later) arranged at a more front side than a display area of the first display means, and the demonstration display control means may control the second display means so as to display the information concerning with the game in an area (for example, the symbol display area 21L, 21C, 21R) corresponding to the symbol display parts.

In the gaming machine of the present invention, the demonstration display control means may control the game result display means based on information concerning with a winning combination other than the winning combination indicated by the information concerning with the internal winning combination.

According to the present invention, the gaming machine comprises game result display means for displaying a game result thereon; beneficial state generating means for generating a beneficial state for a player when a specific game result is displayed on the game result display means; and demonstration display control means for controlling the game result display means so as to conduct demonstration display for collecting players based on information concerning with a game. Thereby, it can be provided the gaming machine in which interest for games can be raised.

BRIEF DESCRIPTION OF THE DRAWINGS

FIGS. 7A and 7B are explanatory views for explaining function of the LED lamps and fluorescent lamps.

DETAILED DESCRIPTION OF THE INVENTION

[First Embodiment]

Figure 1:
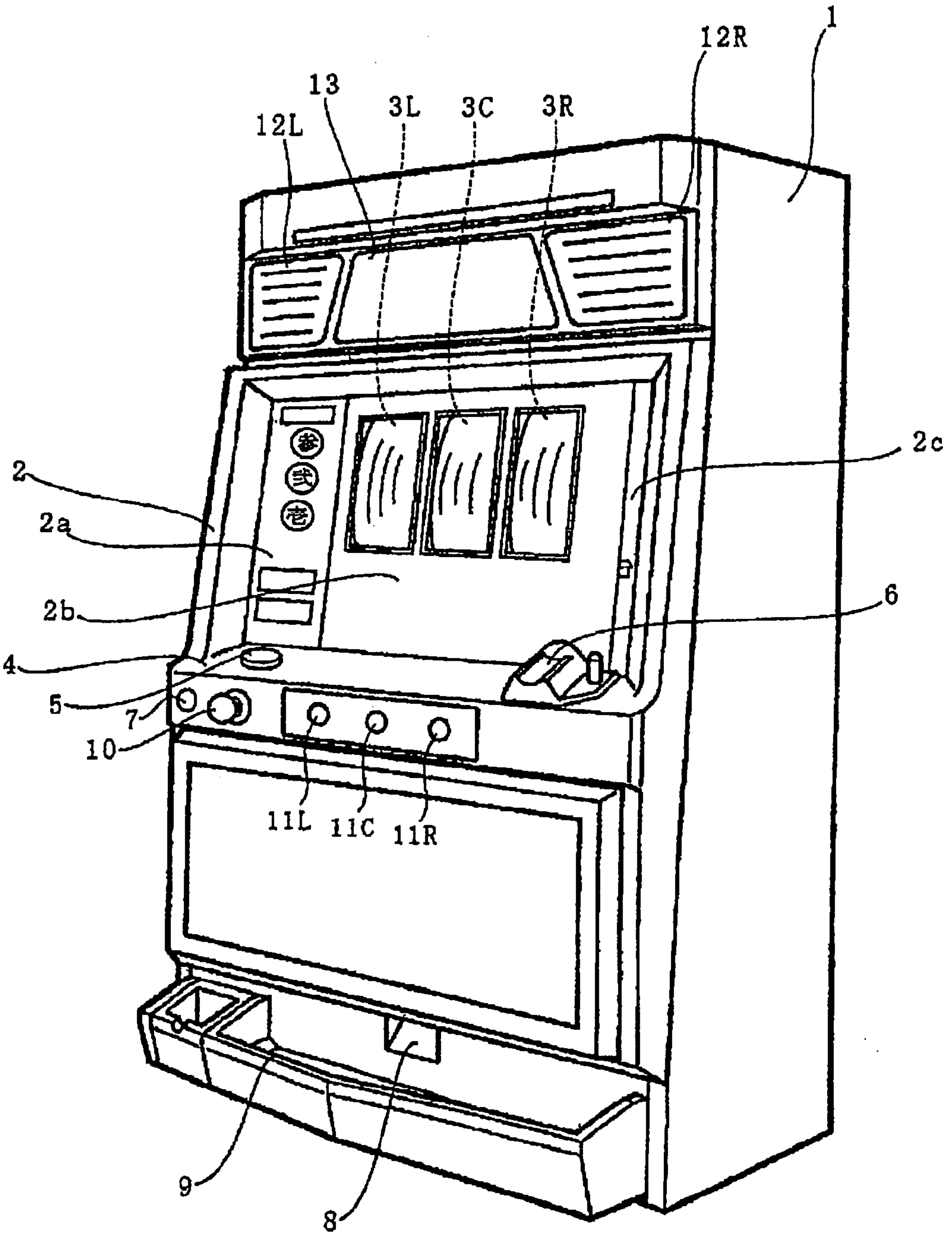
FIG. 1 is a perspective view of a slot machine according to the embodiment.

FIG. 1 is a perspective view showing an outlined shape of a gaming machine 1 according to one embodiment of the present invention. Here, the gaming machine 1 is a so-called Japanese pachi-slot machine. Though, in the gaming machine 1, a player plays games by using game media such as coins, medals or tokens, or a card in which information of game value given to the player is stored, it will be described hereinafter the gaming machine 1 in which medals are used.

Presently, the Japanese pachi-slot machine in the main current has a plural kinds of winning modes. In particular, when a predetermined winning combination is accepted, the player can obtain a more beneficial gaming state than a normal gaming state for a predetermined period without finishing the game by only one payout of medals. As such winning combination, there exist one winning combination in which the game relatively giving large benefit to the player can be done in predetermined times (this winning combination is called “BIG BONUS” and abbreviated as “BB” hereinafter) and another winning combination in which the game relatively giving small benefit to the player in predetermined times (this winning combination is called “REGULAR BONUS” and abbreviated “RB” hereinafter).

And in the Japanese pachi-slot machine in the main current, in order to materialize the winning combination that medals or coins are paid out when a predetermined symbol combination stands side by side along pay lines made activated (abbreviated as “activated line” hereinafter), it is required to internally win the winning combination (abbreviated as “internal winning” hereinafter) by the internal lottery treatment (abbreviated as “internal lottery” hereinafter) and to conduct stop operation of the symbols by the player at the timing that the symbol combination indicating the winning combination internally won (abbreviated as “internal winning combination” hereinafter) can stop along the activated lines. That is to say, even if the winning combination is internally won, the winning according to the internal winning combination cannot be realized when the stop operation by the player is out of the timing. Namely, in the present Japanese pachi-slot machine in the main current, it is required technique to conduct stop operation of the symbols at good timing. This technique is called “observation push”, thus it is highly appreciated the technical intervention in the present Japanese pachi-slot machine.

At the front surface of a cabinet 2 entirely forming the gaming machine 1, a panel display unit 2*a*, a liquid crystal display unit 2*b* and a fixed display unit 2*c*, which have substantially vertical planes, are formed. As for the panel display unit 2*a*, the liquid crystal display unit 2*b* and the fixed display unit 2*c*, they will be described with reference to FIG. 2, hereinafter. In the cabinet 2 (at the rear side of the liquid crystal display unit 2*b*), three reels 3L, 3C, 3R (the first display means comprising the game result display means), on each outer periphery of which symbol line comprising a plural kinds of symbols is described, are rotatably arranged along a horizontal line. The reels 3L, 3C, 3R form the variable display means. Symbols on each reel (rotational drum type display device) can be seen through symbol display areas 21L, 21C, 21R (shown in FIG. 2 hereinafter). Each reel is constructed so as to be able to rotate at a constant rotational speed (for example, 80 rotations/minute).

At a lower position of the panel display unit 2*a*, the liquid crystal display unit 2*b* and the fixed display unit 2*c*, a frontward projection portion 4 having a substantially horizontal plane is formed. At the left side of the frontward projection portion 4, it is arranged a BET switch 5 for betting medals credited by button pressing operation. At the right side of the frontward projection portion 4, a medal insertion slot 6 is formed. At the front left side of the frontward projection portion 4, it is provided a c/p switch 7 for switching credit/payout of medals obtained in the game by the player based on button pressing operation. On the basis of switching by the c/p switch 7, medals are paid out from a medal payout opening 8 and the paid medals are accumulated in a medal receiving tray 9.

At the right side of the C/P switch 7, a start lever 10 (game start instruction means operable by the player), which starts rotation of the reels when operated by the player and starts variable display of the symbols (starts the game) within each of the symbol display areas 21L, 21C, 21R (see FIG. 2), is provided so as to be able to rotate within a predetermined angle. At the front center of the frontward projection portion 4 and the right side of the start lever 10, three stop buttons 11L 11C, 11R (game result leading means operable by the player), which is operated to stop rotation of the reels 3L, 3C, 3R, respectively, are arranged. At the upper left and right sides of the cabinet 2, speakers 12L, 12R are arranged. Between the speakers 12L, 12R, a payout table panel 13 which shows winning combinations of the symbols and the number of medals paid out as awards, is provided.

Figure 2:
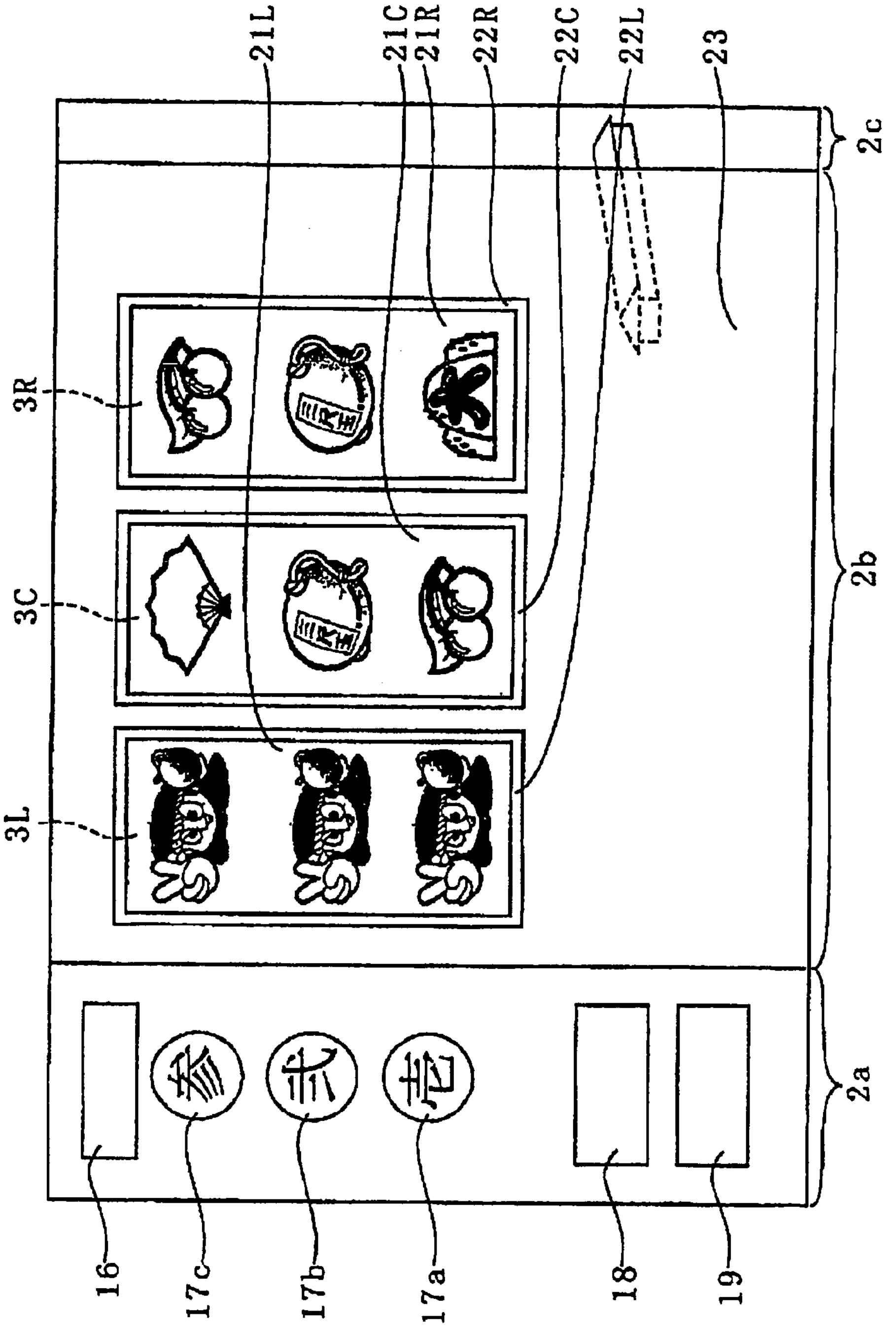
FIG. 2 is an explanatory view showing a panel display part and a liquid crystal display part.

With reference to FIG. 2, the panel display unit 2*a*, the liquid crystal display unit 2*b* and the fixed display unit 2*c* will be explained.

The panel display unit 2*a* comprises a bonus game information display part 16, BET lamps 17*a*~17*c*, a payout display part 18 and a credit display part 19. Here, the bonus display part 16 is constructed from 7-segment LEDs and displays the game information during the bonus game. The 1-BET lamp 17*a*, 2-BET lamp 17*b* and MAX-BET lamp 17*c* are turned on according to the medal number betted to conduct the game. The 1-BET lamp 17*a* is turned on when the betted medal number is "1". The 2-BET lamp 17*b* is turned on when the betted medal number is "2". And the MAX-BET lamp 17*c* is turned on when the betted medal number is "3". The payout display part 18 and the credit display part 19 are constructed from 7-segment LEDs respectively. The payout display part 18 displays the payout medal number when the winning is materialized. The credit display part 19 displays the medal number accumulated (credited).

The liquid crystal display unit 2*b* comprises the symbol display areas 21L, 21C, 21R, window frame display areas 22L, 22C, 22R and effect display area 23. The display contents displayed on the liquid crystal display 2*b* are variably changed according to the variable symbol display mode of the reels 3L, 3C, 3R, stop display mode of the symbols and operation of a liquid crystal display device 31 mentioned hereinafter.

The symbol display areas 21L, 21C, 21R are provided corresponding to the reels 3L, 3C, 3R, respectively, and display the symbols arranged on the outer periphery of the reels 3L, 3C, 3R and various effects thereon. Here, in a case that the reels 3L, 3C, 3R corresponding to the symbol display areas 21L, 21C, 21R are rotating or the stop buttons 11L, 11C, 11R corresponding to the symbol display areas 21L, 21C, 21R are in a operable state for stop operation of the reels 3L, 3C, 3R, each symbol display area 21L, 21C, 21R is transparently displayed so as to be able to easily recognize the symbols arranged on the outer peripheries of the reels 3L, 3C, 3R, and effect effected through still images or moving images by, for example, symbols, letters, figures, marks, characters is not displayed.

The window frame display areas 22L, 22C, 22R are formed so as to enclose each symbol display area 21L, 21C, 21R and represents the frames of the symbols arranged on the outer peripheries of the reels 3L, 3C, 3R.

The effect display area 23 is formed in an area other than the symbol display areas 21L, 21C, 21R and the window frame display areas 22L, 22C, 22R in the liquid crystal display unit 2*b*. This effect display area 23 displays the image (representing so-called "WIN LAMP") conclusively indicating that bonus winning is realizable, the effect to increase interest for games and the information necessary for the player to beneficially advance the game.

The fixed display unit 2*c* is an area to display the images determined beforehand. Concretely, the fixed display unit 2*c* displays "a part of row houses" which is described on a display plate 33 mentioned hereinafter. By combining the image displayed on the fixed display unit 2*c* and the image displayed on the effect display area 23, one still image or moving image can be displayed. In the embodiment, one complete image of the row houses can be displayed.

Further, with reference to FIGS. 3 and 4, LED lamps 29 arranged in the reels 3L, 3C, 3R will be described. The LED lamps 29 function as illumination means for illuminate the symbols arranged on the outer peripheries of the reels 3L, 3C, 3R and one of illumination means for illuminating the areas mainly corresponding to the symbol display areas 21L, 21C, 21R within an area of a liquid crystal panel 34 (mentioned later). Thus, the LED lamps 29 function as common illumination means for commonly illuminating the above symbols and the areas. And the LED lamps 29 also function as rear illumination means for illuminating the first display means from the backside thereof.

Figure 3:
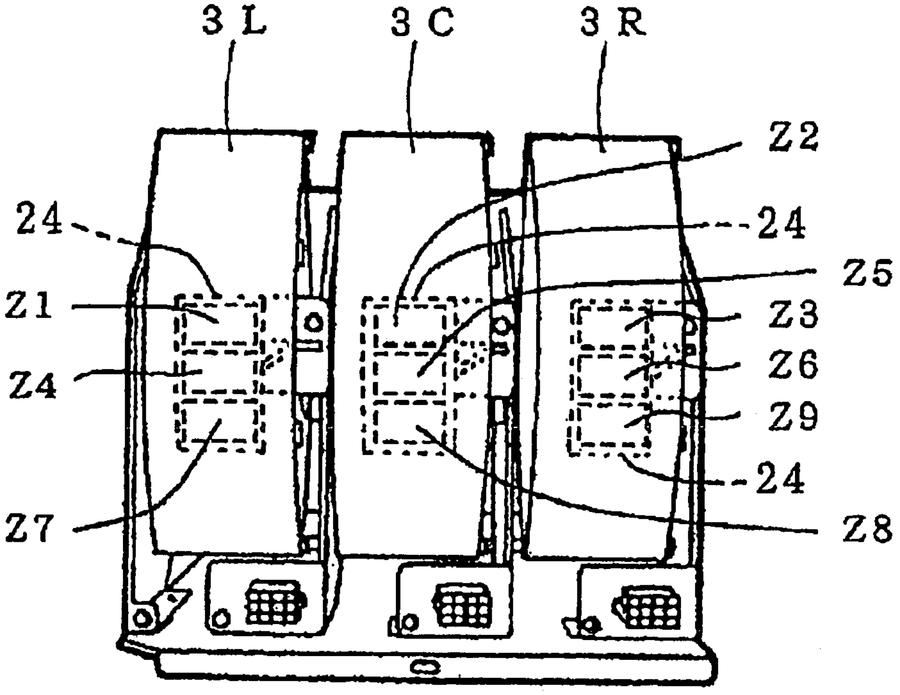
FIG. 3 is an explanatory view showing an external appearance of a reel mechanism in which lamps are arranged within each reel.

As shown in FIG. 3, in the reels 3L, 3C, 3R, there are arranged LED receiving circuit boards 24 which are positioned behind the symbols of three symbol lines (totally nine symbols), each symbol line appearing in each of symbol display areas 21L, 21C, 21R when rotation of the reels 3L, 3C, 3R stops. Each LED receiving circuit board 24 has three LED receiving portions in each of which a plurality of LED lamps 29 are provided. Hereinafter, among nine LED receiving portions, the LED receiving portion is serially represented by Z1, Z2 and Z3 from the left portion in the horizontal upper line, the LED receiving portion is serially represented by Z4, Z5 and Z6 from the left portion in the horizontal center line and the LED receiving portion is serially represented by Z7, Z8 and Z9 from the left portion in the bottom horizontal line. The LED lamp 29 illuminates the rear side of the reel sheet by white light, the reel sheet being attached to the reel 3L, 3C, 3R along the outer periphery thereof The reel sheet is made translucent, thus light emitted from the LED lamp 29 permeates to the front plane of the reel sheet.

Figure 4:
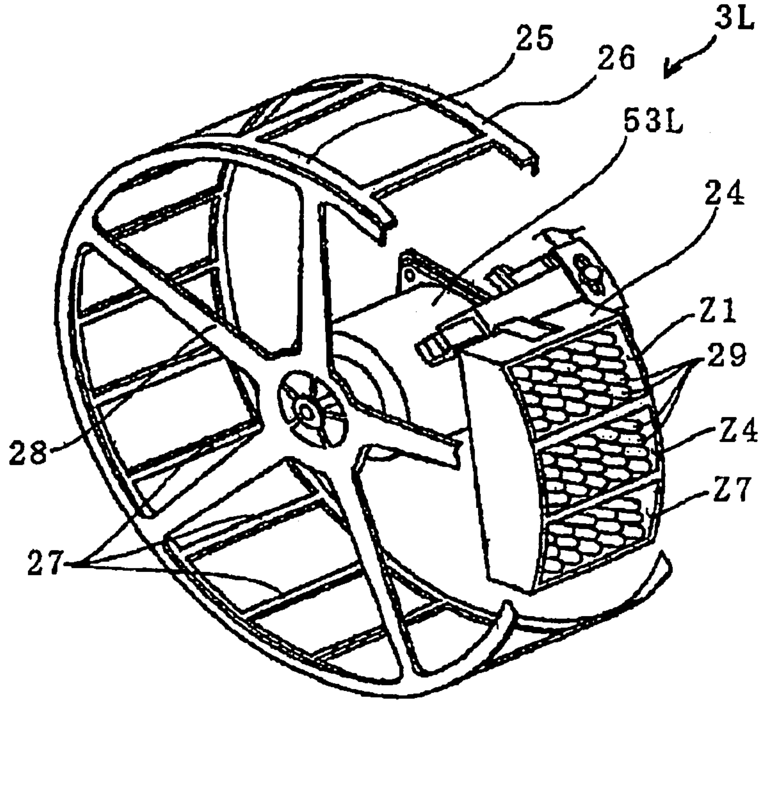
FIG. 4 is a perspective view showing a reel and a circuit board for receiving LEDs therein arranged in the reel.

As shown in FIG. 4, the reel 3L is constructed from a cylindrical frame construction in which two circular frames 25 and 26 with the same shapes are connected by a plurality of connecting members 27 while separating with a distance (corresponding to the reel width) therebetween, and transmitting members 28 for transmitting driving force of a stepping motor 53L (see FIG. 8) arranged in the center position of the frame construction to the circular frames 25 and 26. Here, the reel sheet attached to the outer periphery of the reel 3L is omitted.

The LED receiving circuit board 24 arranged within the reel 3L has three LED receiving portions Z1, Z4 and Z7, each receiving a plurality of LED lamps 29. The LED receiving circuit board 24 is arranged so that the LED receiving portions Z1, Z4, Z7 position at rear sides of the symbols (totally three symbols), respectively, the symbols being seen through the symbol display area 21L by the player. Here, though the reels 3C and 3R are not shown, both reels have the same construction and the LED receiving circuit board 24 is arranged within each reel.

Figure 5:
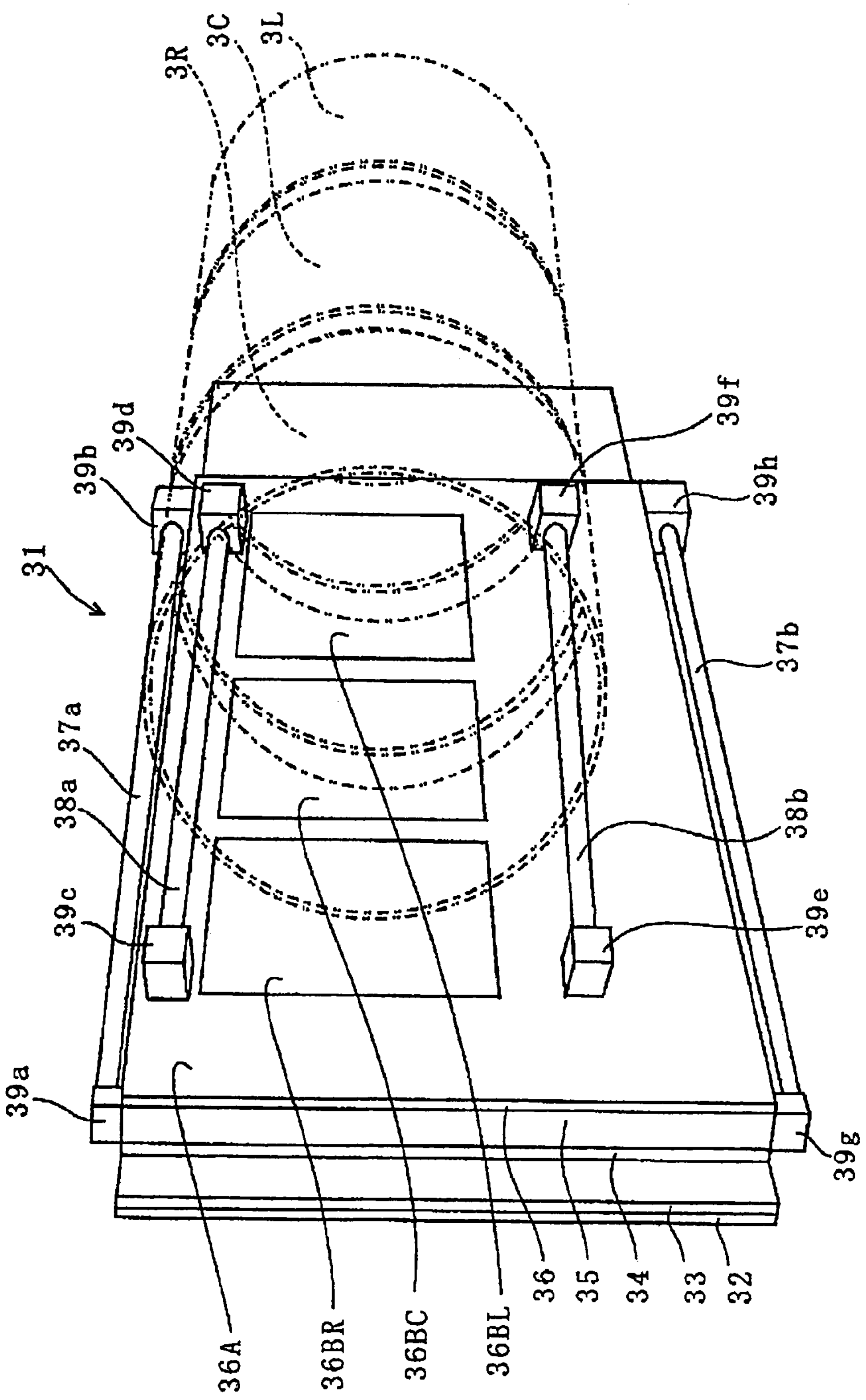
FIG. 5 is a perspective view roughly showing a construction of the liquid crystal display device.
Figure 6:
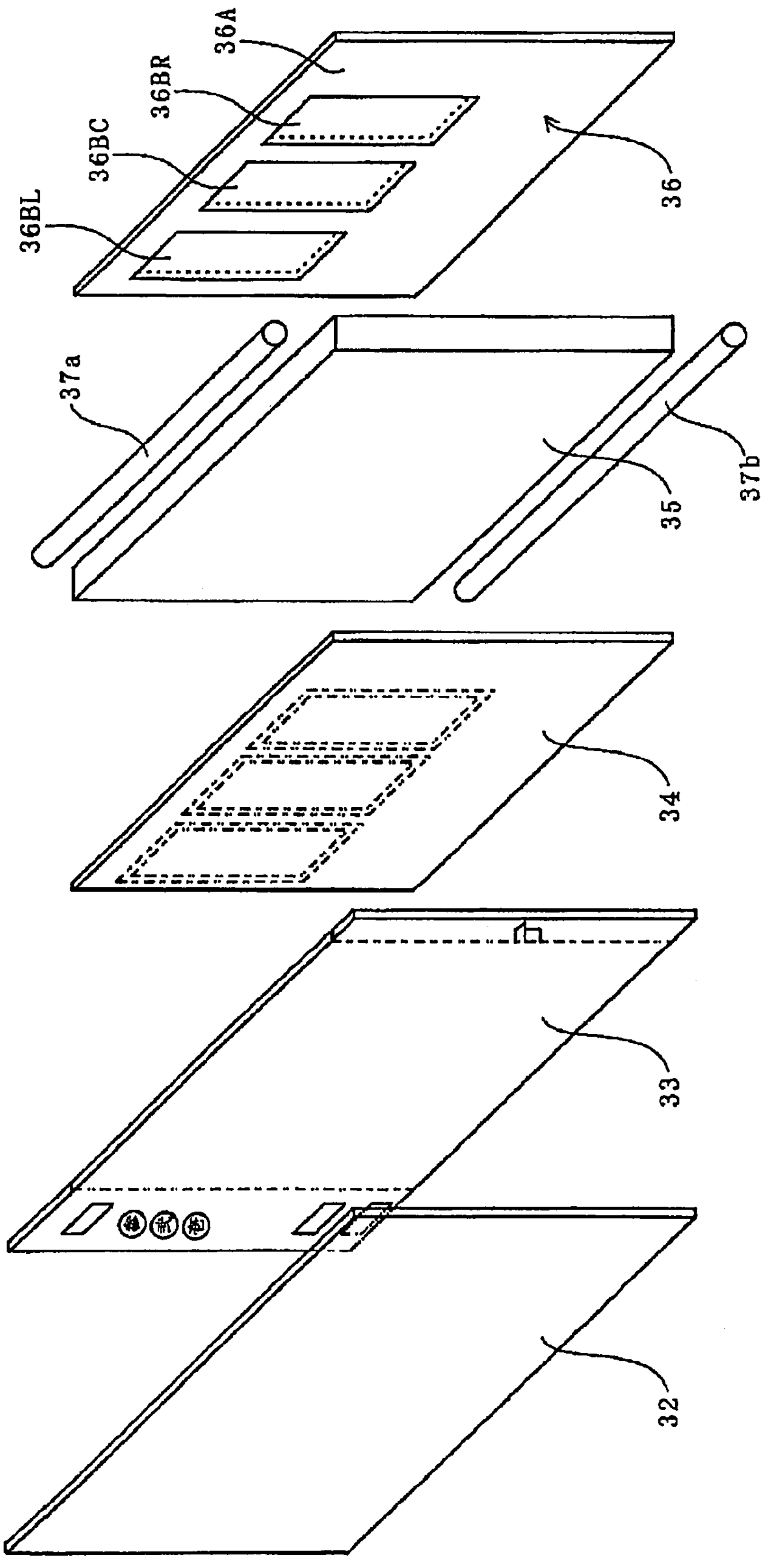
FIG. 6 is an exploded perspective view showing a part of the liquid crystal display device.

Next, with reference to FIGS. 5 and 6, a transmission type liquid crystal display device 31 (corresponding to the second display means constructing the game result display means) will be described. FIG. 5 is a perspective view (seeing from the rear side of the cabinet 2) showing outline construction of the liquid crystal display device 31. FIG. 6 is an exploded perspective view showing a partial construction of the liquid crystal display device 31.

The liquid crystal display device 31 is constructed from a protect glass 32, a display plate 33, a liquid crystal panel 34, a light guide plate 35, a reflection film 36, fluorescent lamps 37*a*, 37*b*, 38*a*, 38*b* functioning as so-called white light sources (capable of emitting light including light having all wavelengths with a predetermined ratio so that specific colors are inconspicuous to eyes of persons), lamp holders 39*a*~39*h* and a flexible circuit board (not shown) comprising a table carrier package (TCP) mounting an IC for driving the liquid crystal panel, the TCP being connected to a terminal portion of the liquid crystal panel 34. The liquid crystal display device 31 is arranged at a more front side than the display areas of the reels 3L, 3C, 3R (more front side than the display planes thereof) so as to spread over the reels 3L, 3C, 3R. And the reels 3L, 3C, 3R and the liquid crystal display device 31 are independently arranged (with a predetermined distance therebetween).

The protect glass 32 and the display plate 33 are made of light transmittable material. The protect glass 32 is provided with an object to protect the liquid crystal panel 34. At the areas corresponding to the panel display unit 2*a* of the display plate 33 and the fixed display unit 2c, images are described. Here, various display parts positioned at the rear side of the area in the display plate 33 corresponding to the panel display unit 2a and electric circuits for operating the BET lamps 17a~17c are omitted to show.

The liquid crystal panel 34 is formed by filling liquid crystal material in clearance formed between the transparent plate such as a glass plate on which thin film transistor layer is formed and the transparent plate facing thereto. The display mode of the liquid crystal panel 34 is set to normally white. Here, "normally white" means a construction that the liquid crystal panel 34 becomes in a white display state (light can advance toward the display plane, that is, light transmitted can be seen from outside) when the liquid crystal panel 34 is not driven. By utilizing the liquid crystal panel 34 constructed to have the normally white mode, the symbols (variable display and stop display of the symbol display parts) arranged on the reels 3L, 3C, 3R can be seen and recognized through the symbol display areas 21L, 21C, 21R even if it occurs a trouble that the liquid crystal panel cannot be driven. Thereby, the player can continue the game. That is to say, if the above trouble occurs, it can be conducted the game based on the basic function such as the variable display and the stop display of the reels 3L, 3C, 3R.

The light guide plate 35 is arranged at the rear side of the liquid crystal panel 34 in order to lead the light emitted from the luminescent lamps 37a, 37b to the liquid crystal panel 34 (to illuminate the liquid crystal panel). For example, the light guide plate 35 is constructed from the light transmittable member with thickness of about 2 cm (having light transmitting ability) made of acrylic resin.

As the reflection film 36, for example, it is used the member that silver deposition layer is formed on white polyester film or aluminium thin film. The reflection film 36 reflects light led to the light guide plate 35 toward the front side thereof This reflection film 36 is constructed from a reflection area 36A and non-reflection areas (non-transmittable areas) 36BL, 36BC, 36BR. The non-reflection areas 36BL, 36BC, 36BR are formed as the light transmittable areas which are made of transparent material and transmit the light led thereto without reflecting, and are arranged at each front position of symbols (totally three symbols) displayed when rotation of the reels 3L, 3C, 3R is stopped. In this case, areas corresponding to the reel sheet function as the light transmittable areas. Concretely, sizes and positions of the non-reflection areas 36BL, 36BC, 36BR coincide with those of the symbol display areas 21L, 21C, 21R. The reflection area 36A reflects the light led thereto and functions as one of the illumination means for the area mainly corresponding to the window frame display areas 22L, 22C, 22R and the effect display area 23 within the area on liquid crystal panel 34. According to the above construction, since the player can see and recognize variable display and stop display of the symbols in the symbol display areas through the light transmittable areas in reflection means, the player can enjoy the game based on the display mode in the symbol display areas and the liquid crystal display device.

The fluorescent lamps 37a and 37b are arranged along the upper edge and the lower edge of the light guide plate 35 and both ends of the fluorescent lamp 37a, 37b are supported by lamp holders 39. The fluorescent lamps 37a and 37b function as illumination means for the area mainly corresponding to the window frame display areas 22L, 22C, 22R and the effect display area 23 within the area on the liquid crystal panel 34. Namely, the fluorescent lamps 37a and 37b emit light led to the light guide plate 35 (the lamps separately lead light to the light guide plate 35).

And the fluorescent lamps 38a and 38b are arranged so as to face toward the reels 3L, 3C, 3R at the upper and lower positions on the rear side of the reflection film 36. The light, which is emitted from the fluorescent lamps 38a and 38b and reflected on the surface of the reels 3L, 3C, 3R, further entered in the non-reflection areas 36BL, 36BC, 36BR, illuminates the liquid crystal panel 34. Therefore, the fluorescent lamps 38a and 38b function as the illumination means for illuminating the symbols arranged on the reels 3L, 3C, 3R and one of the illumination means for the areas mainly corresponding to the symbol display areas 21L, 21C, 21R within the area on the liquid crystal panel 34. The fluorescent lamps 38a and 38b function as common illumination means for illuminating both the above symbols and areas. Further, the fluorescent lamps 38a and 38b also function as the forward illumination means for illuminating the first display means from the front side thereof.

As mentioned above, the first display means and the second display means are commonly illuminated by the common illumination means. That is to say, since not only the first display means but also the second display means are illuminated by the light emitted from the common illumination means, cost becomes cheaper than a case that the illumination means is independently arranged for each display means. Further, by controlling the common illumination means illumination control can made simple and the same illumination for two display means can be also realized at the same time.

Next, with reference to FIG. 7, function of the LED lamp 29 and the fluorescent lamps 37a, 37b, 38a, 38b will be described. In FIG. 7, moving direction of the emitted light from the lamp is shown by arrows.

FIG. 7(1) schematically shows function of each lamp when the liquid crystal existing at the symbol display areas 12L, 21C, 21R is not driven (voltage is not added between the transparent plates of portions corresponding to the symbol display areas in the liquid crystal panel 34).

A part of the light emitted from the fluorescent lamps 38a, 38b is reflected on the reel sheet. And a part of the light emitted from the LED lamps 29 arranged on the LED receiving circuit board 24 penetrates through the reel sheet. Since the above light penetrates through the non-reflection areas 36BL, 36BC, 36BR, the light guide plate 35 and the liquid crystal panel 36 both of which constructs the liquid crystal display device 31, the player can see and recognize the symbols arranged on the reels. Therefore, in a case that the liquid crystal existing at the symbol display areas 12L, 21C, 21R is not driven, the LED lamps 29 and the fluorescent lamps 38a, 38b function as the illumination means for the symbols arranged on the reels 3L, 3C, 3R.

On the contrary, the light emitted from the fluorescent lamps 37a, 37b and led into the light guide plate 35 penetrates through the liquid crystal panel 34 and enters in eyes of the player. That is, the fluorescent lamps 37a, 37b function as the illumination means for the area in the liquid crystal panel 34 corresponding to the above window frame display areas 22L, 22C, 22R and the effect display area 23.

FIG. 7(2) schematically shows function of each lamp when the liquid crystal existing at the symbol display areas 12L, 21C, 21R is driven (voltage is added between the transparent plates of portions corresponding to the symbol display areas in the liquid crystal panel 34).

A part of the light emitted from the fluorescent lamps 38a, 38b is reflected on the reel sheet. And a part of the light emitted from the LED lamps 29 penetrates through the reel sheet. Since a part of the above light is reflected on or absorbed in or penetrated through the areas that the liquid crystal is driven within the area of the liquid crystal panel 34, the player can see and recognize the effect display and the like displayed on the symbol display areas 21L, 21C, 21R. Therefore, in a case that the liquid crystal existing at the symbol display areas 12L, 21C, 21R is driven, the LED lamps 29 and the fluorescent lamps 38*a*, 38*b* function as the illumination means corresponding to the symbol display areas 21L, 21C, 21R within the area of the liquid crystal panel 34.

Here, in a case that a part of the areas corresponding to the symbol display areas 21L, 21C, 21R within the area of the liquid crystal panel 34 is driven, the LED lamps 29 and the fluorescent lamps 38*a*, 38*b* function as the illumination means for the symbols arranged on the reels 3L, 3C, 3R and for the areas corresponding to the liquid crystal not driven in the symbol display areas 21L, 21C, 21R within the liquid crystal panel 34.

Figure 8:
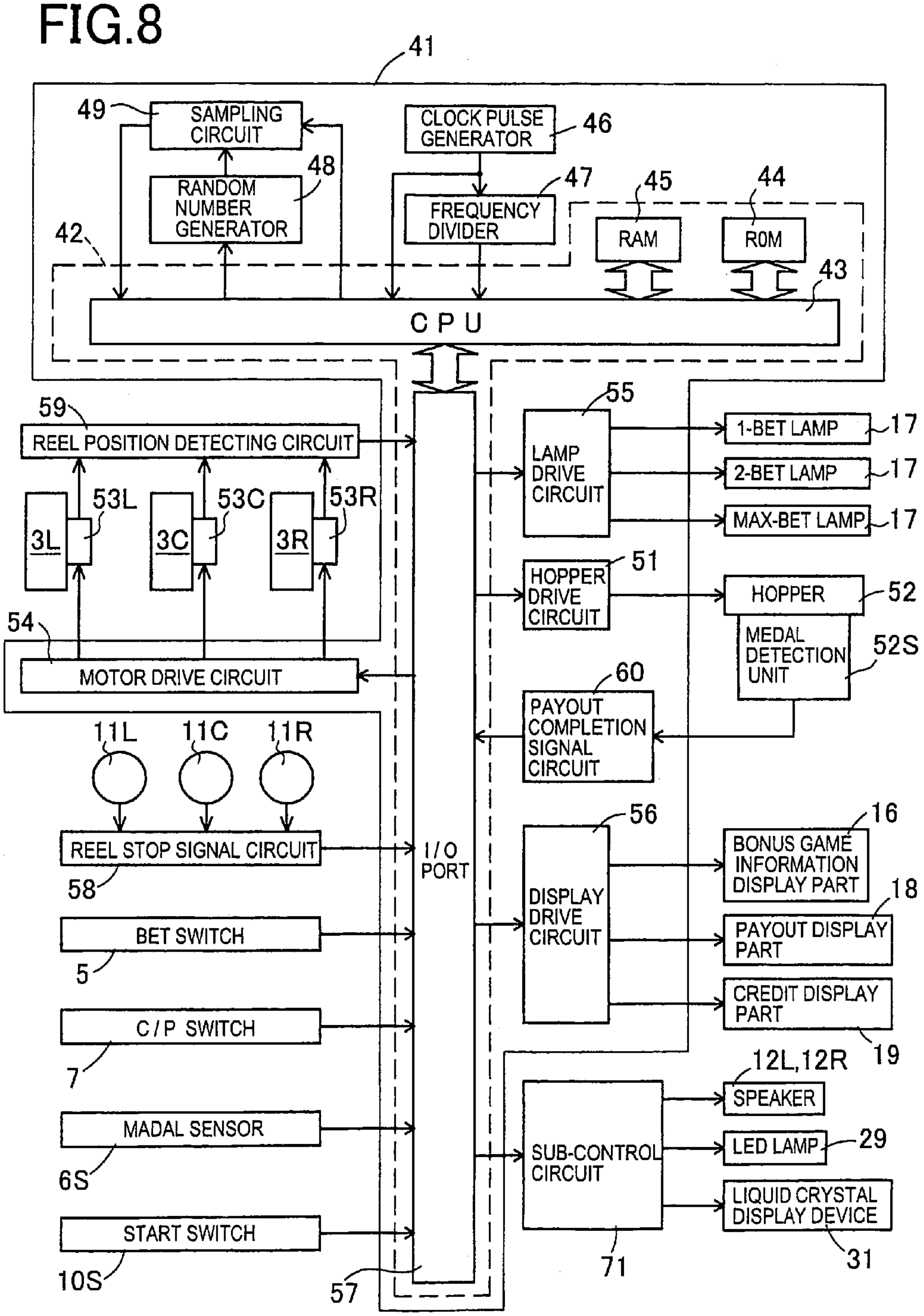
FIG. 8 is a block diagram showing an electrical circuit in the embodiment.

FIG. 8 shows the circuitry construction including a main control circuit 41 for controlling game treatment operation in the gaming machine 1, peripheral devices electrically connected to the main control circuit 41, and a sub-control circuit 71 for controlling the liquid crystal display device 31 and speakers 12L, 12R based on the control command transmitted from the main control circuit 41. The main control circuit 41 and the sub-control circuit 71 construct the game result display control means. The main control circuit 41 has functions as the internal winning combination determination means, the first display control means and the beneficial state producing means. The internal winning combination determination means determines the internal winning combination among plural winning combinations based on the output from the game start instruction means. The first display control means controls the first display means based on the determined result by the internal winning combination determination means and the output by the game result leading means. The beneficial state producing means produces beneficial state for the player when a predetermined game result is displayed on the game result display means. And the sub-control circuit 71 controls the second display means based on the determined result by the internal winning combination determination means and the output from the game result leading means.

The main control circuit 41 is mainly constructed from a microcomputer 42 arranged on the circuit board, in addition to a circuit for sampling random number. The microcomputer 42 includes a CPU 43 conducting control operation according to preset program, a ROM 44 and a RAM 45.

To the CPU 43, a clock pulse generator 46 generating reference clock pulses, a frequency divider 47, a random number generator 48 for generating random numbers sampled and a sampling circuit 49 are connected respectively. Here, as the means for sampling random number, it may construct that random number sampling is done according to the operation program of the CPU 43 in the microcomputer 42. In this case, the random number generator 48 and the sampling circuit 49 may be omitted, or these may be remained to back up random number sampling operation.

In the ROM 44 of the microcomputer 42, there are stored a probability lottery table utilized for judging random number sampling conducted every operation of the start lever 10 (start operation), a stop control table for determining stop combination of the reels according to operation of the stop buttons and various control instructions (commands) to transmit to the sub-control circuit 71. Here, the sub-control circuit 71 never transmits commands, information and the like to the main control circuit 41, but one-way transmission from the main control circuit 41 to the sub-control circuit 71 is only done.

In the circuit of FIG. 8, as main actuators controlled based on control signal from the microcomputer 42, there are various lamps (1-BET lamp 17*a*, 2-BET lamp 17*b*, MAX-BET lamp 17*c*), various display parts (bonus game information display part 16, payout display part 18, credit display part 19), a hopper 52 as the game value giving means (including drive part for payout) accumulating medals and paying out a predetermined number of medals according to instruction by a hopper drive circuit 51 and stepping motors 53L, 53C, 53R for driving the reels 3L, 3C, 3R to be rotated.

A motor drive circuit 54 for driving and controlling the stepping motors 53L, 53C, 53R, a hopper drive circuit 51 for driving and controlling the hopper 52 and a lamp drive circuit 56 for driving and controlling various lamps and a display drive circuit 56 for driving and controlling display parts are connected to the output part of the CPU 43 through an I/O port 57. These drive circuits controls operation in each of the actuators when receiving control commands such as drive commands each of which is output from the CPU 43.

Further, as for the input signal producing means mainly producing input signals which are necessary for the microcomputer 42 to produce the control commands, there are provided the BET switch 5, the medal sensor 6S for detecting the inserted medals, the C/P switch 7, the start switch 10S, the reel stop signal circuit 58, the reel position detecting circuit 59 and the payout completion signal circuit 60. These are also connected to the CPU 43 through the I/O port 57.

The medal sensor 6S detects the medals inserted in the medal insertion slot 6. The start switch 10S detects operation of the start lever 10. The reel stop signal circuit 58 produces stop signal corresponding to operation of each stop button 11L, 11C, 11R. The reel position detecting circuit 59 provides signal to detect the position of each reel 3L, 3C, 3R with the CPU 43 when receiving pulse signal from the reel rotation sensor. The payout completion signal circuit 60 produces signal for detecting the medal payout completion when the count number (corresponding to the medal number paid out from the hopper 52) by the medal detection unit 52S reaches to data of a designated number.

In the circuit shown in FIG. 8, the random number generator 48 generates random numbers within a predetermined numeral range and the sampling circuit 49 conducts sampling of one random number at the suitable timing after the start lever 10 is operated. Based on the thus sampled random number and the probability lottery table stored in the ROM 44, the internal winning combination of the symbols is determined. And after the internal winning combination is determined, sampling of the random number is conducted again to select the "stop control table".

After rotation of the reels 3L, 3C, 3R is started, it is counted the number of the drive pulses each of which is provided with each of the stepping motors 53L, 53C, 53R, and the counted number is written in the predetermined area of the RAM 45. The reset pulse is generated from each of the reels 3L, 3C 3R every one rotation thereof, and these reset pulses are input to the CPU 43 through the reel position detecting circuit 59. Based on the thus obtained reset pulses, the count number of drive pulses counted in the RAM 45 is cleared to "0". Thereby, in the RAM 45, the count number corresponding to the rotational position within one rotation in each of the reels 3L, 3C, 3R is stored.

In order to connect the rotational positions of the reels 3L, 3C, 3R with the symbols described on the outer peripheries of the reels, a symbol table is stored in the ROM 44. In this symbol table, both code numbers, each of which is serially given every a predetermined rotational pitch of each reel 3L, 3C, 3R by setting the rotational position producing the reset pulse as the reference rotational position, and symbol codes, each of which indicates the symbol provided corresponding to each of the code numbers, are connected with each other.

Further, in the ROM 44, a winning symbol combination table is stored. In the winning symbol combination table, winning symbol combinations corresponding to various winnings, medal payout numbers each of which corresponds to each winning and winning determination codes each of which represents each winning, are corresponded with each other. The above winning symbol combination table is referred when the stop control of the left reel 3L, the center reel 3C and the right reel 3R is conducted and when the winning is confirmed after all reels 3L, 3C, 3R are stopped.

When one of winning combinations is internally won by the lottery treatment (probability lottery treatment) based on the above sampling of the random number, the CPU 43 sends stop signals for conducting stop control of the reels 3L, 3C, 3R to the motor drive circuit 54, based on the operation signals sent from the reel stop signal circuit 58 at the timing that the player operates the stop buttons 11L, 11C, 11R and the selected stop control table.

If the symbols stop in a stop mode that the winning combination internally won is realized, the CPU 43 provides the payout command signal to the hopper drive circuit 51, thereby a predetermined number of the medals are paid out from the hopper 52. At that time, the medal detection unit 52S counts the number of medals paid out, and when the number of medals paid out reaches to the designated number, the medal payout completion signal is input to the CPU 43. Thereby, the CPU 43 stops driving of the hopper 52 through the hopper drive circuit 51, as a result, the payout treatment of the medals is terminated.

Figure 9:
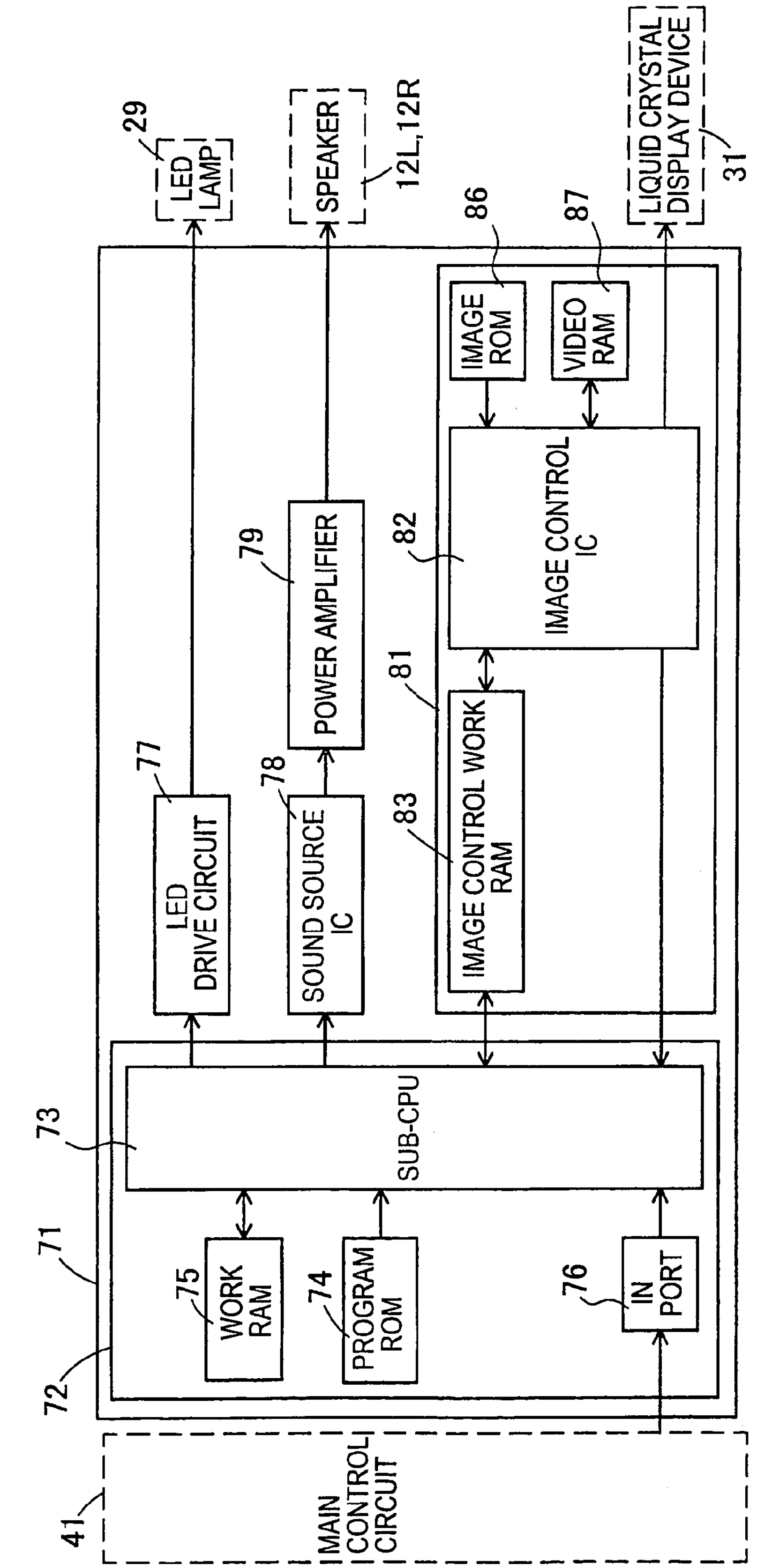
FIG. 9 is a block diagram showing a construction of a sub-control circuit.

FIG. 9 shows a construction of the sub-control circuit 71. The sub-control circuit 71 conducts turning on and off treatment of the LED lamps 29 based on the control command from the main control circuit 41, display control of the liquid crystal display device 31 and output control of sounds output from the speakers 12L, 12R. This sub-control circuit 71 is constructed on a separate circuit board from the circuit board on which the main control circuit 41 is formed and is mainly constructed from a microcomputer (abbreviated as "sub-microcomputer" hereinafter) 72. The sub-control circuit 71 is constructed from a LED drive circuit 77 as the display control means for controlling a plurality of ornamental lamps, the LED lamps 29 and the fluorescent lamps 37*a*, 37*b* which are arranged on the cabinet of the gaming machine 1, an image control circuit 81 as the display control means of the liquid crystal display device 31, a sound source IC 78 for controlling sounds output from the speakers 12L, 12R and a power amplifier 79 acting as the amplifier.

The sub-microcomputer 72 includes a sub-CPU 73 conducting control operation according to the control command sent from the main control circuit 41, a program ROM 74 acting as the memory means and a work RAM 75. Though the sub-control circuit 71 does not have the clock pulse generator, the frequency divider, the random number generator and the sampling circuit, it is constructed so that the random sampling is conducted in the operation program of the sub-CPU 73. And the program ROM 74 stores the control program executed in the sub-CPU 73. Further, the program ROM 74 also stores the image control program concerning with display on the liquid crystal display device 31 and various select tables. The work RAM 75 is constructed as the temporary memory means utilized when the control program is executed by the sub-CPU 73.

The image control circuit 81 is constructed form an image control work RAM 83, an image ROM 86, a video RAM 87 and an image control IC 82. The image control IC 82 determines the display contents displayed on the liquid crystal display device 31 based on parameters designated by the sub-CPU 73. The image control work RAM 83 is used for temporarily storing images when images are formed by the image control IC 82 and when images followingly displayed on the liquid crystal display device 31 are designated to the image control IC 82 by the sub-CPU 73. The image control IC 82 forms images corresponding to display contents determined by the sub-CPU 73 and outputs to the liquid crystal display device 31. The image ROM 86 stores various images to form the images to be displayed. And the video RAM 87 is constructed as the temporary memory means utilized when images are formed in the image control IC 82.

Next, with reference to FIGS. 10 and 11, display examples in the liquid crystal display unit 2*b* will be described. Here, in the liquid crystal display unit 2*b* of the embodiment, after it is continued for a predetermined time interval (for example, one minute) a state (abbreviated "non-gaming state" hereinafter) that medal inserting operation and operation of the BET switch 5 (abbreviated as "BET operation" hereinafter) are not conducted after one game is finished (for example, rotation of all reels is stopped), demonstration display (waiting image display) is basically conducted. This demonstration display indicates a display for notifying a state that the gaming machine is in a waiting state for the player. And existence or nonexistence of the demonstration display and display patterns (modes) are changed according to the internal winning combination and the like. Hereinafter, "demonstration" is abbreviated as "demo".

First, with reference to FIG. 10, display example in the liquid crystal display unit 2*b* will be described.

Figure 10:
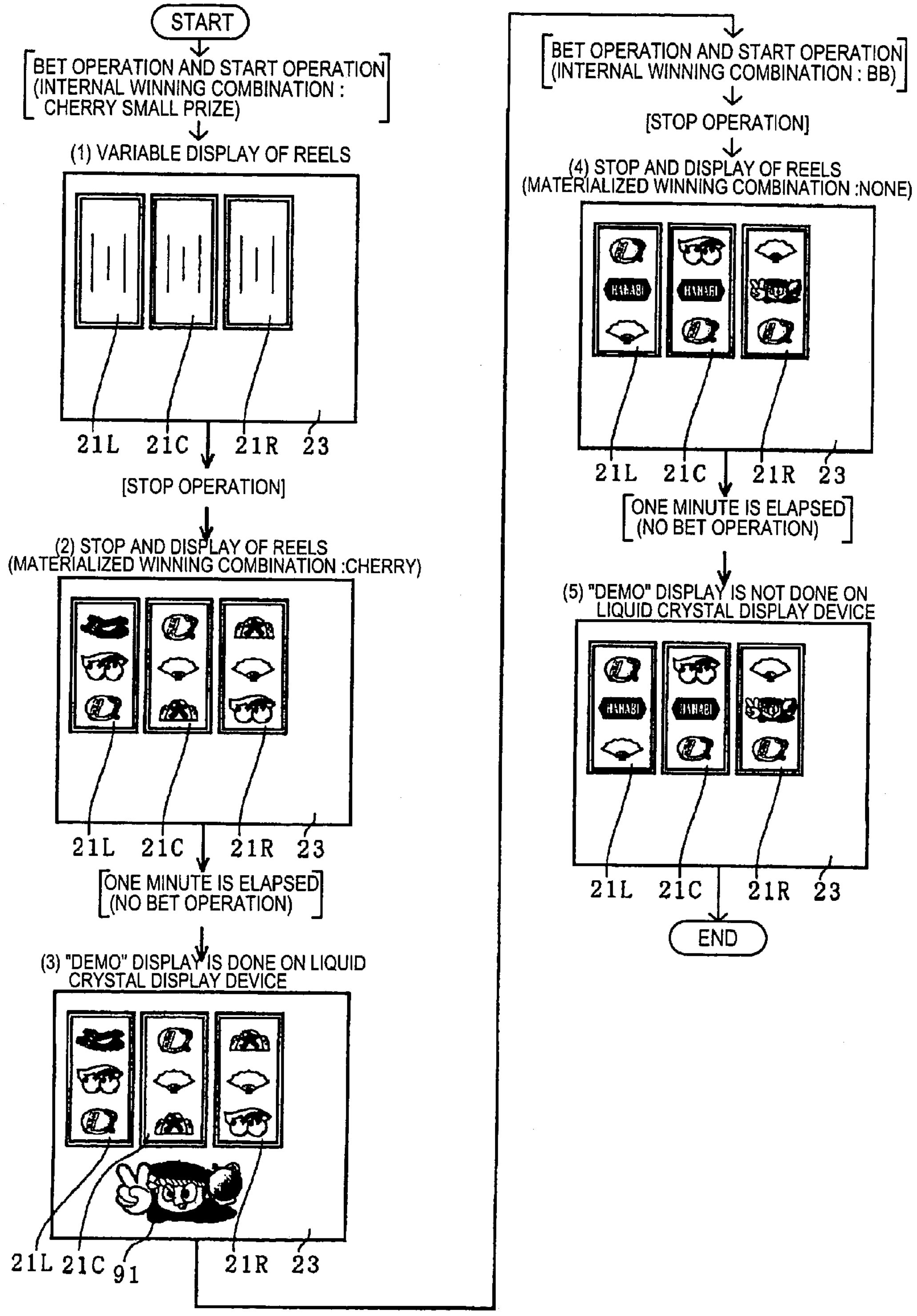
FIG. 10 is a view showing a display example of the liquid crystal display unit.

After the BET operation and start operation are conducted, variable display of the symbols is done in the symbol display areas 21L, 21C, 21R as shown in FIG. 10(1). In this game, "cherry small combination" is determined as the internal winning combination. Further, after stop operation by the player is done, stop display of the symbols is conducted in the symbol display areas 21L, 21C, 21R, as shown in FIG. 10(2), and "cherry small combination" is materialized. After stop operation of the symbols is done, the non-gaming state is continued for a predetermined time (for example, one minute), and thereafter "demo" display is done in the direction display area 23 as shown in FIG. 10(3). Concretely, a character 91 is displayed below the symbol display areas 21L, 21C, 21R.

And, during "demo" display, the BET operation and the start operation are conducted. "Demo" display is ended by conducting the BET operation. In the game started by the start operation, "BB" is determined as the internal winning combination. Further, after the stop operation by the player is done, stop display of the symbols is done as shown in FIG. 10(4). Here, "BB" internally won is not materialized. Therefore, "BB" internally won is carried over (the state internally won or the state that it is permitted to materialize "BB" is maintained). After stop display of the symbols is done, if the non-gaming state is continued for one minute, the display contents of the liquid crystal display unit 2*b* become contents shown in FIG. 10(5).

In the liquid crystal display unit 2*b* shown in FIG. 10(5), "demo" display is not conducted based on that "BB" is carried over. As shown in FIG. 10(5), in a case that the information concerning with the internal winning combination indicates that "BB" (specific winning combination) is the internal winning combination, "demo" display is not done (the demonstration display control means does not control the game result display means). Thereby, for example, it can be notified to the player that the internal winning combination is "BB" (specific winning combination), as a result, interest for games can be raised.

Next, with reference to FIG. 11, display example in the liquid crystal display unit 2*b* will be described.

The BET operation and the start operation are conducted, and "BB" is determined as the internal winning combination. Further, stop operation by the player is done, and stop display of the symbols is done as shown in FIG. 11(1). Here, "BB" is not materialized. And as shown in FIG. 11(2), at the right side of the right symbol display area 21R, an information image 92 is displayed. The information image 92 shows the character 91 who crosses both arms. The information image 92 is an image for decisively notifying that bonus such as "BB" or "RB" and the like is permitted to materialize. After stop display of the symbols is done, the non-gaming state is continued for one minute, and thereafter display contents of the liquid crystal display unit 2*b* become contents shown in FIG. 11(3). In the liquid crystal display unit 2*b* shown in FIG. 11(3), "demo" display is not conducted based on that the information image 92 is displayed.

Next, with reference to FIGS. 11(4) and 11(5), "demo" display examples will be explained. Determination of "demo" display is done in ST 14 shown in FIG. 12 mentioned later.

Figure 11:
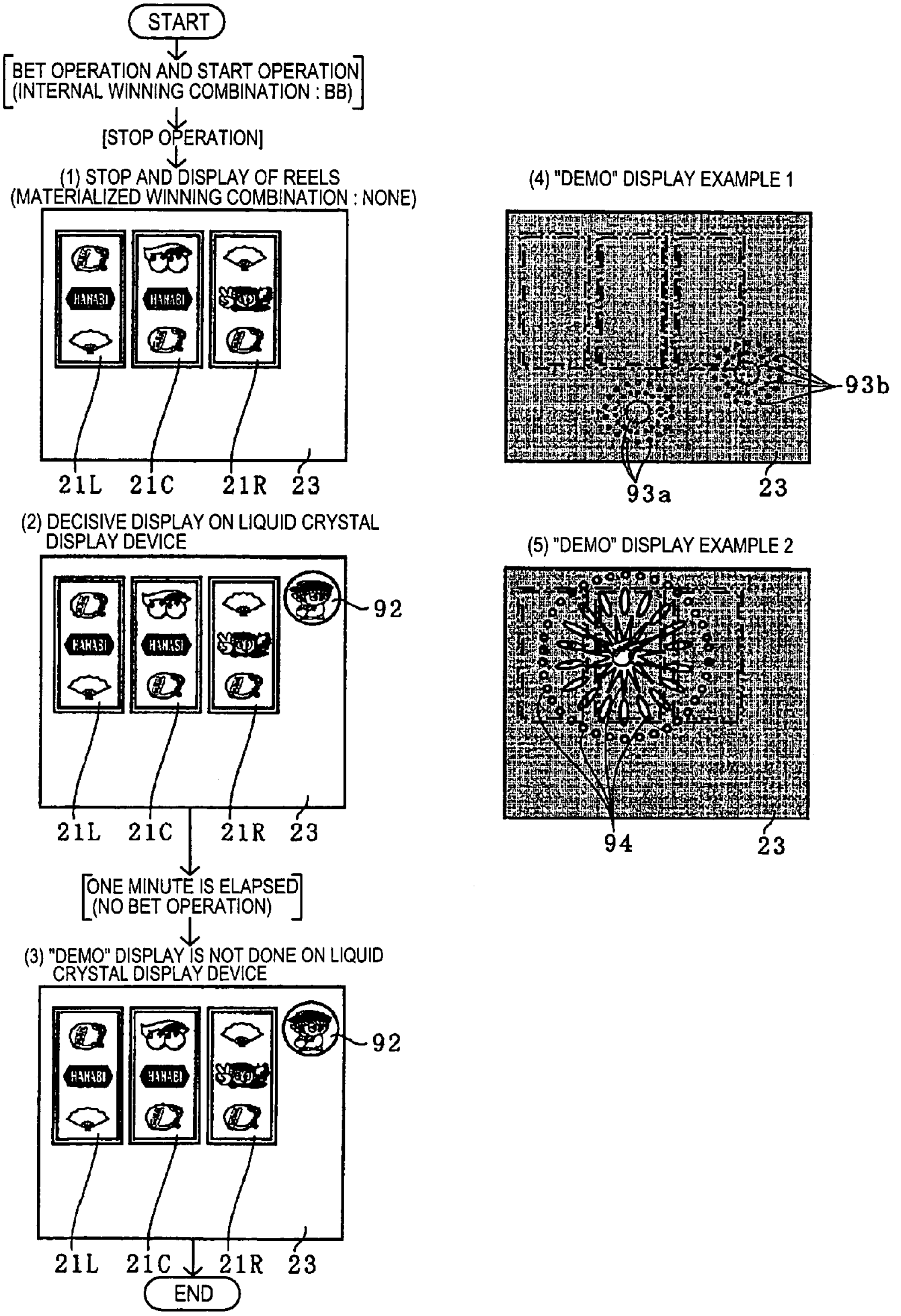
FIG. 11 is a view showing a display example of the liquid crystal display unit.

FIG. 11(4) shows a "demo" display example 1 in the liquid crystal display unit 2*b*. In the "demo" display example 1, two fireworks 93*a* and 93*b* are displayed in entire liquid crystal display unit 2*b* (two fireworks are displayed over the symbol display area, the window frame display area and the effect display area).

FIG. 11(5) shows a "demo" display example 2 in the liquid crystal display unit 2*b*. In this "demo" display example 2, big fireworks 94 a center of which is set in the central symbol display area 21C, are displayed entirely over the liquid crystal display unit 2*b*. In the symbol display areas 21L, 21C, 21R, a partial shape of the fireworks 94 is displayed by white color. That is to say, by forming areas in which liquid crystal is not driven, the partial shape of the fireworks is displayed. Therefore, the player can see and recognize the stopped symbols through the areas representing a part of the fireworks 94.

Here, only if the information concerning with the internal winning combination indicates that "BB" (specific winning combination) is the internal winning combination, it may be selected the display mode (specific demonstration mode) corresponding to the "demo" display example 2. Thereby, it can be added to games the interest, not existing in previous gaming machines, in which the player can recognize or predict the internal winning combination by the "demo" display. And if the "demo" display is done in a part or all of the symbol display areas 21L, 21C, 21R, and the player can grasp a part of the stop mode of the reels 31, 3C, 3R, the player starts games while being interested in the stop mode of the reels 3L, 3C, 3R. Further, function of the "demo" display having object to make the player play games, can be raised.

Figure 12:
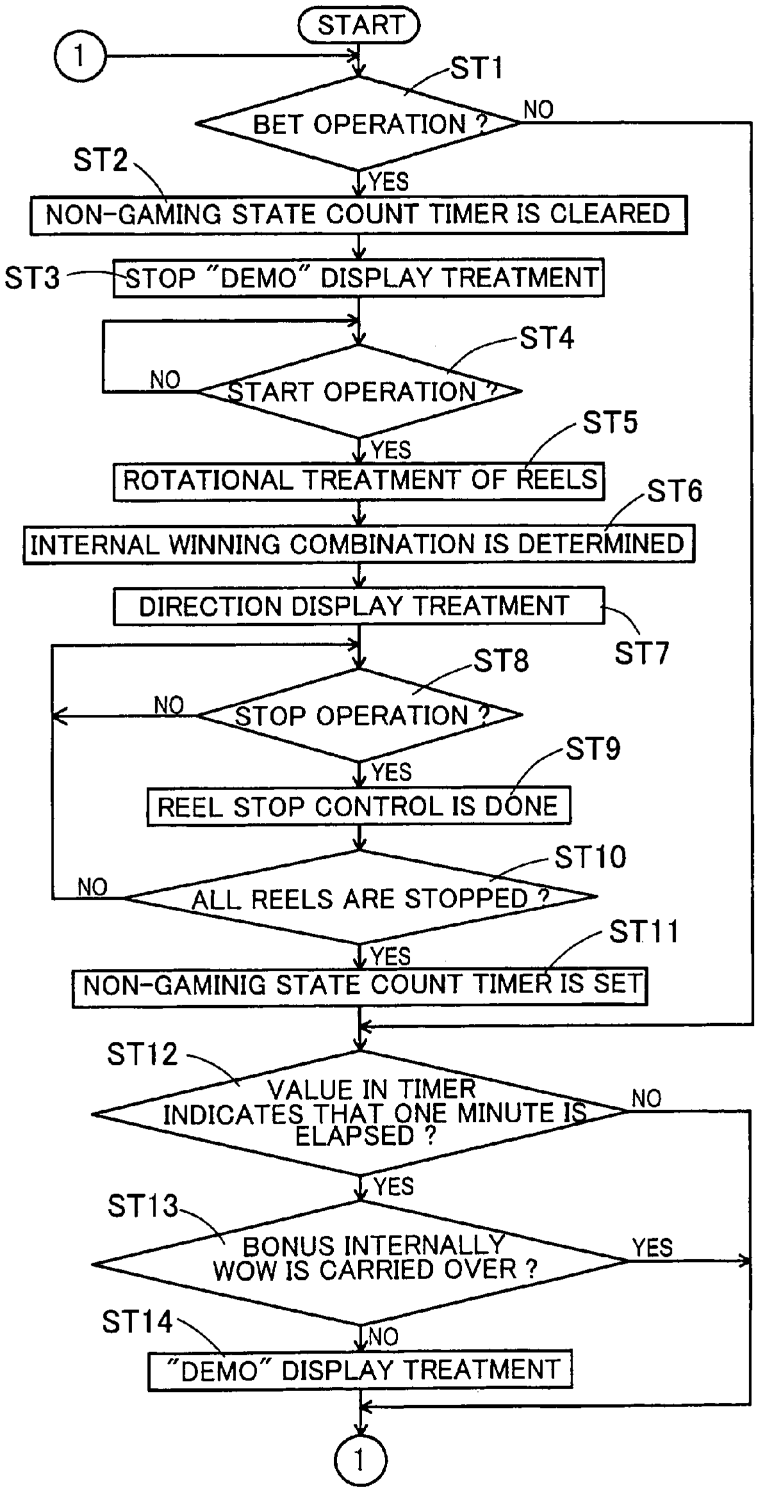
FIG. 12 is a flowchart indicating treatment concerning with demonstration display.

Next, with reference to FIG. 12, control operation of the main control circuit 41 will be explained.

First, the CPU 43 judges whether the BET operation is done or not, that is, whether an input from the BET switch 5 or the medal sensor 6S exists or not (step 1 (abbreviated ST 1 hereinafter)). If this judgement is "YES", a non-gaming state count timer for counting a time that the non-gaming state continues is cleared (ST 2), and the procedure shifts to ST 3. In ST 3, if the "demo" display is conducted, termination treatment of the "demo" display is done, thereafter the procedure shifts to ST 4. In St 4, it is judged whether the start operation is done or not, that is, an input from the start switch 10S exists or not. If this judgement is "YES", rotational treatment of the reels is conducted (ST 5). Continuously, the internal winning combination is determined (ST 6), effect display treatment is done (ST 7) and the procedure shifts to ST 8. In the effect display treatment, display contents in the liquid crystal display unit 2*b* while gaming are determined.

In ST 8, it is judged whether the stop operation is done by the player or not, that is, an input from the reel stop signal circuit 58 exists or not. If this judgement is "YES", the reel corresponding to the stop button that the stop operation is done is controlled to stop (ST 9). Continuously, it is judged whether all reels are stopped or not (ST 10). If this judgement is "YES", the procedure shifts to ST 11, and if this judgement is "NO", the procedure shifts to ST 8. In ST 11, the non-gaming state count timer is set, thereafter the procedure shifts to ST 12.

In ST 12, it is judged whether or not the value in the non-gaming state count timer indicates that one minute is elapsed. If this judgement is "YES", the procedure shifts to ST 13, and if this judgement is "NO", the procedure shifts to ST 1. In ST 13, it is judged whether bonus internally won is carried over or not. If this judgement is "YES", the procedure shifts to ST 1, and if this judgement is "NO", the procedure shifts to ST 14. In ST 14, the "demo" display treatment is conducted, thereafter the procedure shifts to ST 1. In the "demo" display treatment, it is determined the game information of the internal winning combination in the game previously done and the "demo" display mode due to the result of random number lottery (for example, the "demo" display example 1, the "demo" display example 2). Thereafter, the "demo" display treatment is executed according to the determined "demo" display mode.

Here, although the "demo" display treatment is conducted only if the bonus is not carried over, the "demo" display may be conducted based on the game information, the result of random number lottery and the like also if the bonus is carried over. Further, though treatment about the "demo" display is done by the main control circuit 41, the sub-control circuit 71 may allot a part of such treatment. For example, the sub-control circuit 71 can also conduct treatment in ST2, ST 11~14, based on commands (information) transmitted from various switches, sensors or the main control circuit 41.

[SECOND EMBODIMENT]

Next, the gaming machine 1 of the second embodiment will be described. The construction, electric circuits in the gaming machine of the second embodiment are basically same as those in the first embodiment. In the gaming machine of the second embodiment, the sub-control circuit 71 conducts treatment about the "demo" display.

Figure 13:
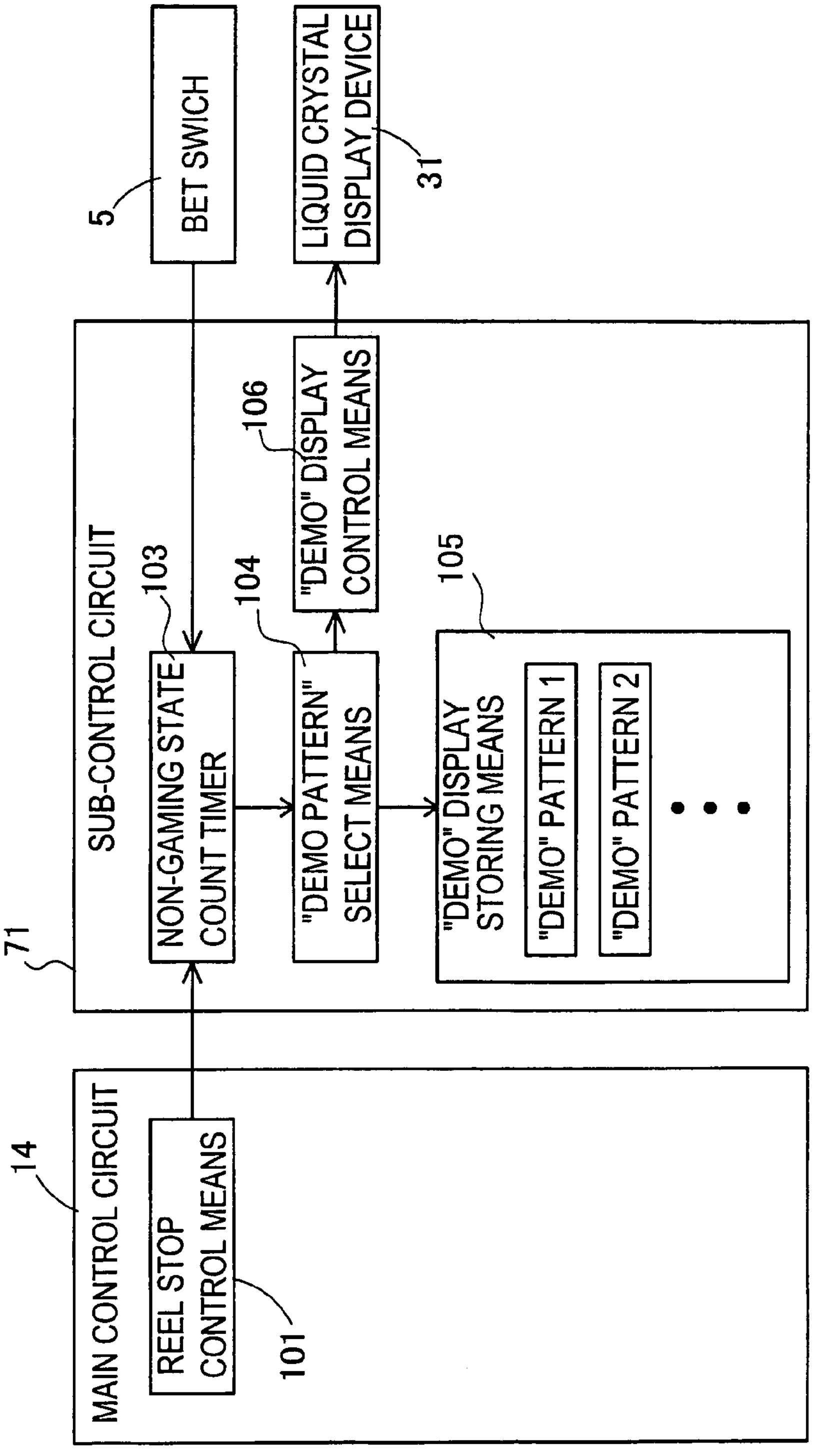
FIG. 13 is a block diagram including function materializing means (operational part).

With reference to FIG. 13, it is explained a block diagram including function realizing means (operation part) in the sub-control circuit 71, the function realizing means being necessary for realizing function in the gaming machine 1. The sub-control circuit 71 has various means as follows.

That is to say, the sub-control circuit 71 has:

the non-gaming state count timer 103 for counting a time during which the non-gaming state is continued, based on that it is received "all reels stop command", which is input from the reel stop control means 101 in the main control circuit 41 and indicates that all reels 3L, 3C, 3R are controlled to stop (one game is ended), and based on an input signal from the BET switch 5;

the "demo" pattern select means 104 for selecting (determining) the "demo" display mode (abbreviated as "demo" pattern hereinafter), based on the information of the internal winning combination, the information of bonus which is carried over, the game information such as information indicating whether the information image is displayed or not, the result of the random number lottery, and/or contents stored in the "demo" pattern storing means 105 mentioned later;

the "demo" pattern storing means 105 for storing information of plural types of the "demo" patterns; and the "demo" display control means 106 for controlling the liquid crystal display device 31 so that the "demo" pattern selected (determined) by the "demo" pattern select means 104 is displayed in the liquid crystal display unit 2*b*.

Since the "demo" pattern select means 104 controls the liquid crystal display device 31 based on the information concerning with the game, the player can enjoy selecting gaming machine based on the "demo" pattern (interest for games can be raised). And the player can also select gaming machine based on the information concerning with the game (the information of the internal winning combination, the information of winning combination carried over and the like). Further, the "demo" pattern select means 104 is constructed to be able to control the game result display means so that the game result is displayed by plural display modes including the specific demonstration display mode in the game result display means.

As mentioned, though description is done according to the embodiments, the present invention is not limited to the above.

And in the embodiment, though the reels 3L, 3C, 3R are adopted as the first display means and the liquid crystal display device 31 is adopted as the second display means, the present invention is not limited to this. For example, CRT, LCD, plasma display, 7-segment LED, LED dot-matrix, lamp, LED, fluorescent lamp, organic EL display, disc, electronic paper, flexible LED, flexible liquid crystal, liquid crystal projector, FED and the like can be adopted as the first display means, the second display means or the third display means. Further, the third display means different from the first display means and the second display means can be arranged at a more front side than the second display means when seeing the front side of the gaming machine, between the first display means and the second display means, or at a more rear side than the first display means when seeing the front side of the gaming machine. The display result displayed on the first display means, the second display means or the third display means is constructed from still images or moving images. The combination, in which two or more or all of the first display means, the second display means and the third display means are combined, can be integrally constructed. In this case, there may be a case that the unit integrally constructed can be wholly exchanged, and this case is preferable since time and labor for decomposing work or assembling work thereof can be omitted and maintenance work can be improved. Further, if parts and construction can be commonly used in the unit, this case is preferable since it can contribute to cost reduction. Of course, if the illumination means commonly utilizable for the common illumination means is included in the unit, the same effect similar to the above can be expected.

Further, the beneficial state includes: a state that a predetermined combination (for example, replay, BB, RB, small combination, single bonus and the like) is materialized; free game; a state that information necessary for the player to favorably advance the game is notified; a state that probability to get internal winning of a predetermined combination is high; a state that winning of a predetermined combination is materialized with high probability; winning of a predetermined combination or a predetermined combination carried over is permitted to materialize with high probability; so-called "challenge time" that the reels are basically stopped based on the operation timing of the stop buttons by the player; small combination; medium combination; big combination; combination (state that so-called "symbol start opening" (symbol variable movement is started when a ball enters in the symbol start opening) is opened or enlarged; so-called "probability changing state", so-called "time shortening state"); or combination of the above states. Here, the small combination, the medium combination and the big combination concern with a state that so-called "big winning opening" is opened in the so-called Japanese Pachinko gaming machine.

In the embodiments, although it is explained by using the internal winning combination as the information concerning with the game, the present invention is not limited to this case. For example, it can be utilized the information concerning with the game in the beneficial state. And as the information concerning with the game, it can be utilized the internal winning number of the predetermined winning combination (for example, BB, RB, single bonus, small combination, replay and the like) or materializing number of the predetermined winning combination.

And as the display mode of "the "demo" pattern, it can be utilized "the mode in which notification is conducted", "the mode in which notification is not conducted", "the mode for notifying (erroneously notifying) the information concerning with combinations different from the information (internal winning combination and the like) indicated by the information of games". For example, if it is notified the information concerning with the winning combination other than the winning combination indicated by the information of the internal winning combination, it can add to games the interest that the player predicts whether the winning combination indicated by the information of the internal winning combination is suggested by notification or not. And these modes can be distinguished by "letter's color", "letter's font" and the like.

And when the internal winning combination determination means determines a predetermined combination (for example, bonus) as the internal winning combination, one or plural or all of the illumination means included in the common illuminations means can be turned off. For example, the LED lamps 29 arranged for each of the reels 3L, 3C, 3R can be turned off every the operation button corresponding thereto is operated or every the operation button other than the above operation button is operated. Based on the above constructions, interest for the games increases. And the forward illumination means (the fluorescent lamps 38*a*, 38*b*) can be provided for each of the symbol display parts (the reels 3L, 3C, 3R).

Further, one or plural or all of the illumination means included in the common illumination means can be constructed so as to variably display. For example, still images or moving images can be displayed on the first display means (reel sheet) by changing the turning on mode of the LED lamps 29 or light colors emitted therefrom or by continuously changing those. And self-emitting type plasma display, organic EL display and the like may be adopted as the illumination means (one example of the third illumination means), thereby images can be displayed on the first display means. By this constructions, interest for games increases.

In a case that the special game result (for example, the symbol combination indicating that bonus winning is materialized) is displayed on the first display means or the second display means, it can be provided the special gaming state producing means that the beneficial state for the player is displayed thereon. And both the special gaming state producing means and the second display means can be formed on single control circuit board. And the gaming state can be displayed by superimposing the images displayed on the first display means and the images displayed on the second display means. Further, based on the trigger that a predetermined state is realized, the effect display on the second display means can be done so as to avoid the specific symbols stopped and displayed on the symbol display part or so as to superimpose the specific symbols. If the gaming state is displayed by the superimposed images, the beneficial state for the player may be produced with high probability in comparison with the case in which the superimposed images is not displayed. Thereby, it can include the effect that the player's expectation increases, in excess of the previous case. Thus, such effect can contribute to increase of interest.

In the embodiment, though the start lever 10 is adopted as the game start instruction means, the present invention is not limited to this. For example, the BET switch 5, the medal insertion slot 6, the medal sensor 6S or the start switch 10S can be adopted.

The display includes: display by the sense of sight, display by the sense of hearing, notification by the sense of smelling, turning on of the lamps or combination of those. The display mode includes: colors, patterns, shapes (outline shapes, interior shapes) and the like. And the game result can be displayed after operation of the game start instruction means or the game result leading means.

In the embodiment, though the above mentioned LED drive circuit is utilized as the display control means for a plurality of the ornamental lamps, the LED lamps and the fluorescent lamps, each of which is arranged in the cabinet, the present invention is not limited to this. Turning on control of the LED lamps may be conducted by another display control means. In this case, for example, in turning on control of the LED lamps, electric power may be provided so that the LED lamps are always turned on during a period from power-on of the gaming machine till power-off thereof. Here, turning on includes blinking mode that the LED lamps are intermittently blinked with a very short time interval. Thus, since the LED lamps are always turned on, light emitted from the LED lamps always illuminates each symbol display area even if abnormality occurs in the mentioned LED drive circuit. Thereby, the player can always see the symbols arranged on each of the reels through the each symbol display areas, thus the above turning on control is preferable.

Further, turning on control of the above mentioned fluorescent lamps may be done by another display control means. In this case, for example, in the turning on control of the fluorescent lamps, electric power may be provided so that the fluorescent lamps are always turned on during a period from power-on of the gaming machine till power-off thereof. Thereby, similar to the above, light emitted from the fluorescent lamps always illuminates each symbol display area even if abnormality occurs in the mentioned LED drive circuit. Thereby, the player can always see and recognize the symbols arranged on each of the reels through the each symbol display areas Further, in the embodiment, though the above mentioned sub-CPU conducts display control of a plurality of the ornamental lamps arranged in the cabinet, sound output control and image display control of the liquid crystal display device, the present invention is not limited to this. Another sub-CPU separate from the above sub-CPU may conduct the above various controls. For example, in a case that another sub-CPU separate from the above sub-CPU conducts the control of a plurality of the ornamental lamps arranged in the cabinet and, for example, in a case that abnormality occurs in the display control, it is enough to exchange only the sub-CPU with abnormality occurrence or only the circuit construction including the sub-CPU with abnormality occurrence to the normal sub-CPU or circuit construction having the normal sub-CPU. Therefore, time and labor for removing the cause of the abnormality occurrence can be omitted and such construction is very preferable. And in a case that another sub-CPU other than the above sub-CPU conducts sound output control or image display control, or for example, in a case that abnormality occurs in the sound output control or the image display control, it is enough to exchange only the sub-CPU with abnormality occurrence or only circuit construction including the sub-CPU with abnormality occurrence.

Further, the liquid crystal display device described in the embodiment may have image enlarging means for enlarging the input images by a predetermined magnification. For example, the image enlarging means may convert the image data for 640×480 dots into the image data for 1024×768 dots and output the converted image data to the display part (above mentioned terminal part). Thereby, it can use the image data for small display area, the data quantity thereof being less in comparison with that for the factual display area. As a result, memory quantity of the ROM and image data forming time can be reduced.

And in the embodiment, though the symbol display area is divided corresponding to each of three reels 3L, 3C, 3R, the present invention is not limited to this and the symbol display area may be formed so as not to be divided. For example, it may be conceivable that two or three of the reels 3L, 3C, 3R can be seen and recognized through one symbol display area. And if the first display means and the third display means are arranged at the rear face or side of the second display means, it may be constructed that the player sees and recognizes through one symbol display area a part or whole of the first display means and a part or whole of the third display means. When the reflection means is produced, there may be a case that the reflection means can be easily produced in comparison with a case that a plurality of transparent portions are formed dividedly.

In the embodiment, though the symbol display portions are formed every reel which displays a plurality of symbols while rotating, the present invention is not limited to this. For example, one symbol display area may be formed in the second display means corresponding to one or plural or all of plural reels (plural variable display parts) each of which displays a plurality of symbols while rotating. Entire area of the second display means may construct the symbol display area. The size thereof may be changed.

It is enough that the symbol display area can display the symbol of the first display means, and may be constructed from only member capable of displaying symbols (transparent glass or transparent resin) in which liquid crystal is not provided in the symbol display area.

The first display means or the third display means may be constructed so as to be able to move in directions of up and down, right and left, before and behind, reciprocally move, inducibly vibrate or rotate. In this case, the symbol display part may be constructed so as to move according to the movement of the first display means or the third display means. Based on these operations, it can expect more interesting effect and there may be a case that such operations are applicable for concerning with game contents.

In a case that it is stored in memory means of the gaming machine that the number more than a predetermined number of the specific winning combination not materialized yet is internally won, the display mode of the specific demonstration may be displayed. When seeing such display mode, the player can expect that a lot of benefits may be obtained by playing games in such gaming machine, thereby interest for games can be improved.

And even if it is not stored in memory means of the gaming machine that the number more than a predetermined number of the specific winning combination not materialized yet is internally won, the specific demonstration display mode may be displayed if the gaming machine determines to display the specific demonstration display mode according to a predetermined condition (for example, a predetermined random number lottery). Thereby, appearance rate of the specific demonstration display mode is raised. Thereby, the player expects the probability that the specific demonstration display mode appears and can cope with games. Thus, interest for games can be improved.

Further, the present invention can apply to Japanese Pachinko gaming machine, arrange ball gaming machine, mah-jong ball gaming machine, video-slot machine, video poker machine and the other machines, in addition to the slot machine in the embodiment. And even in the game program imitatively executing operation of the above mentioned slot machine in a family gaming machine, the present invention can apply and execute the game. In this case, CD-ROM, FD (flexible disc) and the similar memory medium can be utilized for the memory medium for storing the game program.

Here, recently in the Japanese Pachinko gaming machine in the main current, the gaming machine, in which an electric display device such as the liquid crystal display device is arranged at the center of gaming plate, is popularized. In this electric display device, a plurality of symbols (abbreviated as "special symbols" hereinafter) represented by images are variably displayed, thereby three lines of reels in the slot machine are imitatively displayed. When variable display of the special symbols stops and a predetermined stop mode (in which the same special symbols stop such as 7-7-7 and this stop mode is generally called "big combination"), the game shifts to the special gaming state beneficial for the player. In general Japanese Pachinko gaming machine, the variable display of the special symbols is started on condition that balls shot within the gaming plate by operation of the shooting handle enter into a predetermined winning hole (so-called "variable display start hole"). After a predetermined time is elapsed the variable display of the special symbols stops.

In this kind of Japanese Pachinko gaming machine, it may be arranged the liquid crystal display device (the second display means) and the first display means (for example, drum-type reels) at a more rear side than the display area (display plane) of the liquid crystal display device when seeing the front side of the gaming machine. And the special symbols may be variably displayed on one or both of the first display means (for example, the liquid crystal display device) and the second display means (for example, drum-type reels).

The above mentioned game result display means may be constructed so as to include the first display means and the second display means provided at a more front side than the display area of the first display means when seeing the front surface of the gaming machine. And the game result display means may be constructed so as to include the first display means and the second display means provided at a more front side than the display area of the first display means when seeing the front side of the gaming machine.

The above mentioned first display means and/or the second display means may be formed in a curved shape. As for extent of the curvature, the first display means and the second display means may have substantially the same curvature. Thereby, there may be a case that design of the gaming machine is improved and the gaming machine is made attractive. Even if the first display means is curved with a small radius of curvature or with a large radius of curvature, the above same effect can be obtained.

The demonstration display control means may include two (first and second) demonstration display control means, each having different operational condition with each other. In this case, the demonstration display control means can control the game result display means so that one or both of the demonstration display control means conduct the demonstration display by a plurality of display modes including the specific demonstration display mode. The specific demonstration display mode may be commonly utilized in two demonstration display control means or individually in each thereof For example, the operational condition of the first demonstration display control means is that the demonstration display is intermittently repeated at time intervals of a predetermined time such that the demonstration display is done for 5 seconds after 10 seconds elapsed since it is judged that the gaming machine lies in the non-gaming state, and after 10 seconds are further elapsed the demonstration display is done for 5 seconds. And the operational condition of the second demonstration display control means is that the demonstration display is intermittently repeated at time intervals different from the operational condition of the first demonstration display control means such that the demonstration display is done for 20 seconds after 60 seconds elapsed since it is judged that the gaming machine lies in the non-gaming state, and after 60 seconds are further elapsed the demonstration display is done for 20 seconds.

In the display control in the above mentioned two demonstration display control means, at least one display mode may be selected among one or plural demonstration display modes and operation of the game result display means may be controlled based on the selected result. By constructing according to the above, variegated effect is further improved or becomes more interesting, thus it is very preferable as the demonstration for collecting players and remarkable effect can be obtained.

Or two (first and second) demonstration display control means may control two display means which is mutually different, respectively.

For example, the first demonstration display control means only controls the game result display means and the second demonstration display control means controls speakers or display device such as lamps other than the game result display means.

Further, one or both of two demonstration display control means may be controlled so as to conduct the demonstration display even while gaming. Thereby, the player in gaming can see variegated effect display, thus there is a case that the player can get relief Further, it is preferable for the player, who is looking for the gaming machine to conduct games, as the demonstration for collecting players.

Anyway, two demonstration display control means can be constructed so as to have the same function in the above shown demonstration display control means and to operate.

The above mentioned reflection means corresponds to means which has at least function to refract a part or whole of light led by the light leading means toward the liquid crystal panel and illuminate the liquid crystal panel.

The above mentioned game start instruction means may be a variable symbol display start hole which produces an output signal when the winning combination or passage of the ball is detected. The game start instruction means in the ball flipping machine corresponds to the variable display start hole for the special symbols (or the start gate), the variable display start hole for the common symbols, the various judging symbol display start holes (or the start gates).

In a case that the above mentioned internal winning combination determination means determines the predetermined combination as the internal winning combination, one or plural illumination means included in the common illumination means is/are turned off. Or the illumination means may always be turned off.

There may be a case that one or plural illumination means included in the common illumination means is/are turned off at the substantially same timing that the above mentioned internal winning combination determination means determines the predetermined combination as the internal winning combination. Or the illumination means may always be turned off.

As for variable display by the illumination means included in the common illumination means, it is conceivable various display modes. For example, it may be constructed so as to be able to execute the special symbol variable display. Here, the special symbol variable display can be executed in the mode such as: brightness in a part or whole of the display part in the illumination means differs from that in the non-specific symbol variable display; still images, moving images, specific letters, numbers, figures, characters, which are not displayed in the non-specific symbol variable display, are displayed; variable display speed differs from that in the non-specific symbol variable display. Further, voluntary display modes may be utilized. And in a case that the specific symbol variable display is conducted, it may be constructed that the beneficial state for the player occurs with high probability in comparison with the case that the specific symbol variable display is not done. Thereby, it can be included the effect that the player's expectation increases, in excess of the previous case. Thus, such effect can contribute to increase of interest.

As for the means adopted as the third display means, it may be adopted display devices which is applicable as the first display means and the second display means, as mentioned above. It may be a case that one or plural effect display reels is/are utilized as the third display means, and both the first display means and the third means are arranged at the rear surface or side of the second display means. In this case, the symbol display area through which the player sees the display area of the third display means may be provided in the second display means. Thereby, the player can easily recognize the display contents on the display area of the third display means, thus this construction is very preferable.

Further, it may be controlled so that the images formed by superimposing the images of the second display means and the images of the third display means are seen by the player, and when such control occurs, the beneficial state occurs with higher probability than the case that such control does not occur. Thereby, it can be included the effect that the player's expectation increases, in excess of the previous case. Thus, such effect can contribute to increase of interest.

Further, any one of the first display means, the second display means and the third display means may be constructed form a movable structure with shapes such as figures, dolls, animals, insects, famous structures, fishes, vehicles. For example, the above structures may be moved with rotation, swing, reciprocal movement or vibration in cases that: the special combination is internally won, the special combination is materialized, the number of the combination which is as same as the special combination internally won but not materialized exceeds a predetermined number, the special images are displayed on the display means different from the above structures. And there may be a case that the above structure is constructed from plural members and a part of the members is/are moved. In this case, there may be a case that it can be further expected more various effects by displaying on other than the image display device.

Further, the front illumination means may be arranged at the front side of the first display means and the second display means. In this case, if the inside of the game arcade is dark, the front illumination means can illuminate both the first display means and the second display means with enough light. Therefore, there may be a case that the player can clearly recognize the images displayed on the display means, thus it can be expected that the player can enjoy more various effects in the gaming machine.

The above mentioned rear illumination means illuminates the second display means from the backside thereof. And the above mentioned front illumination means illuminates the second display means from the backside of thereof. And the front illumination means may illuminate the second display means from the side plane thereof According to the above embodiments or its modifications, it can be obtained following effects.

In the gaming machine of the embodiment, since the demonstration display for collecting players is conducted based on the information concerning with the game, it can be displayed variegated demonstration corresponding to any information among various information stored in the memory means of the gaming machine. Therefore, remarkable effect for collecting players can be expected.

And since the demonstration for collecting players is displayed based on the internal winning combination, there occurs probability capable of expecting the winning combination which is internally won and various demonstration display can be done. Thereby, remarkable effect for collecting players can be expected.

In particular, if the internal winning combination is the specific winning combination and if the demonstration display is not done, the player gets curious feeling against the gaming machine and it can give the player expectation that the specific beneficial state may occur by less games according to such curious feeling. Therefore, effect for collecting players can be expected in excess of the previous case.

Further, if the internal winning combination is the specific winning combination and if the specific demonstration is done, there occurs probability capable of anticipating that the specific winning combination is won as the internal winning combination according to the specific display mode and various demonstration display can be done. Thereby, remarkable effect for collecting players can be expected.

Further, by displaying the information concerning with the game in the area corresponding to symbol display part to which the player gazes with high expectation and the player's eyes naturally direct, effect for collecting players can be remarkably raised.

Further, by displaying the demonstration for collecting players based on the information concerning with the winning combination other than the winning combination indicated by the internal winning combination, appearance rate of the specific demonstration is raised. And even if the player remembers types of demonstration display modes for collecting players, there is a case that such mode does not coincide with the winning combination indicated by the information of the internal winning combination. Therefore, though there is a case that the player is disappointed, the player selects the gaming machine and conducts games with expectation to some extent, and effect of the demonstration display for collecting players can be remarkably raised.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A gaming machine comprising:

a game result display device for displaying a game result thereon;

a beneficial state generating device for generating a beneficial state for a player when a specific game result is displayed on the game result display device; and a demonstration display control device for controlling the game result display device so as to conduct demonstration display for collecting players based on information concerning with a game;

the gaming machine further comprising;

an internal winning combination determination device for determining an internal winning combination;

a game result display control device for controlling the game result display device based on a determined result by the internal winning combination determination device; and a determination device for determining whether or not the internal winning combination becomes a specific internal winning combination;

wherein the demonstration display control device controls the game result display device based the specific internal winning combination when the determination device determines that the internal winning combination becomes the specific winning combination, wherein the demonstration display control device controls the game result display device to display information concerning with the internal winning combination for decisively notified that the specific internal winning combination is permitted to materialize when the specific internal winning combination is not materialized in the game; and wherein the demonstration display control device does not control the game result display device so that the demonstration display is not conducted.

2. The gaming machine according to claim 1, wherein the demonstration display control means device controls the game result display device to conduct the demonstration display by a plurality of display modes including a specific demonstration display mode, and wherein the game result display device is controlled to display by the specific demonstration display mode when the determination device determines that the internal winning combination becomes the specific internal winning combination.

3. The gaming machine according to claim 1, wherein the game result display device includes first display device including a plurality of symbol display parts in which variable display and stop display of one or more of the symbols can be done and second display device arranged in front of a display area of the first display device, and wherein the demonstration display control device controls the second display device so as to display the information concerning with the game in an area corresponding to the symbol display parts.

4. The gaming machine according to claim 1, wherein the demonstration display control device controls the game result display device based on information concerning with a winning combination other than the winning combination indicated by information concerning with the internal winning combination.

5. A gaming machine comprising:

a game result display device for displaying a game result thereon a beneficial state generating device for generating a beneficial state for a player when a specific game result is displayed on the game result display device; and a demonstration display control device for controlling the game result display device so as to conduct demonstration display for collecting players based on information concerning with a game;

the gaming machine further comprising;

an internal winning combination determination device for determining an internal winning combination;

a game result display control device for controlling the game result display device based on a determined result by the internal winning combination determination device;

a determination device for determining whether or not the internal winning combination becomes a specific internal winning combination; and a carry over device for carrying over the specific internal winning combination when the specific internal winning combination determining by the determination device is not materialized in the game;

wherein the demonstration display control device controls the game result display device based on the specific internal winning combination when the determination device determines that the internal winning combination becomes the specific internal wining combination; and wherein the demonstration display control device does not control the game result display device so that the demonstration display is not conducted when the carry over device carried over the specific internal winning combination.

6. The gaming machine according to claim 5, wherein the demonstration display control device control the game result display device to conduct the demonstration display by a plurality of display modes including a specific demonstration display mode, and wherein the result display device is controlled to display by the specific demonstration display mode when the determination device determines that the internal winning combination becomes the specific internal winning combination.

7. The gaming machine according to claim 5, wherein the game result display device includes first display device including a plurality of symbol display parts in which variable display and stop display of one or more of the symbols can be done and second display device arranged in front of a display area of the display device, and wherein the demonstration display control device controls the second display device so as to display the information concerning with the game in an area corresponding to the symbol display parts.

8. The gaming machine according to claim 5, wherein the demonstration display control device controls the game result display device based on information concerning with a winning combination other than the winning combination indicated by information concerning with the internal winning combination.

9. A gaming machine comprising:

a first display device for displaying plural symbols thereon;

a second display device arranged in front of the first display device, the second display device displaying a demonstration image thereon;

a processor programmed to operate with the first display device and the second display device to determine a symbol combination including plural symbols variably display and stopped on the first display device and display the demonstration image on the second display device when a game is not conducted during a predetermined time after the game is terminated;

wherein the processor controls the second display device so as to display the demonstration image so that the symbols display on the first display device are not from outside of the gaming machine, the demonstration image representing information concerning with the determined symbol combination.

* * * * *